US012613821B1

(12) United States Patent
Wang et al.

(10) Patent No.: US 12,613,821 B1
(45) Date of Patent: Apr. 28, 2026

(54) METHOD AND APPARATUS FOR DMA BETWEEN ACCELERATOR CARDS, AND ACCELERATOR CARD, ACCELERATION PLATFORM AND MEDIUM

(71) Applicant: IEIT SYSTEMS (BEIJING) CO., LTD., Beijing (CN)

(72) Inventors: Jiangwei Wang, Beijing (CN); Jingdong Zhang, Beijing (CN); Rui Hao, Beijing (CN); Yanwei Wang, Beijing (CN); Linge Xiao, Beijing (CN); Qianqian Zhao, Beijing (CN); Wei Liu, Beijing (CN)

(73) Assignee: IEIT SYSTEMS (BEIJING) CO., LTD., Beijing (CN)

( * ) Notice: Subject to any disclaimer, the term of this patent is extended or adjusted under 35 U.S.C. 154(b) by 0 days.

(21) Appl. No.: 19/139,813

(22) PCT Filed: Sep. 29, 2024

(86) PCT No.: PCT/CN2024/122460
§ 371 (c)(1),
(2) Date: Jun. 16, 2025

(87) PCT Pub. No.: WO2025/073257
PCT Pub. Date: Apr. 10, 2025

(30) Foreign Application Priority Data

Oct. 7, 2023 (CN) .......................... 202311279391.0

(51) Int. Cl.
*G06F 13/28* (2006.01)
(52) U.S. Cl.
CPC .......... *G06F 13/28* (2013.01); *G06F 2213/28* (2013.01)

(58) Field of Classification Search
CPC ............................ G06F 13/28; G06F 2213/28
See application file for complete search history.

(56) References Cited

U.S. PATENT DOCUMENTS 9,745,951 B1 * 8/2017 Doyle ................... F03B 17/061
10,819,680 B1 * 10/2020 Santan ................ H04L 63/0209
(Continued)

FOREIGN PATENT DOCUMENTS

CN 113535745 A 10/2021
CN 113900982 A 1/2022
(Continued)

*Primary Examiner* — Henry Tsai
*Assistant Examiner* — Christopher A Daley
(74) *Attorney, Agent, or Firm* — IPro, PLLC

(57) ABSTRACT

A method and apparatus of direct memory access DMA between accelerator cards, an accelerator card, an accelerating platform and a non-volatile readable storage medium. The first accelerator card according to the present application can initiatively perform the initiation of the DMA, and, according to the idle-internal-memory datum of the second accelerator card as the data destination terminal recorded in the first accelerator card itself, write the datum directly into the internal memory of the second accelerator card in the mode of DMA, which does not require inquiring the idle-internal-memory address of the second accelerator card before the DMA, and does not require waiting for the second accelerator card to initiate the DMA. The solution realizes the direct DMA writing operation between different accelerator cards at the hardware level, and solves the problem in DMA operation between accelerator cards.

20 Claims, 10 Drawing Sheets in response to an acceleration task having been executed to obtain a to-be-transmitted datum, according to idle internal-memory capacities and accelerator-card functions, determining a second accelerator card in the accelerating platform configured for processing the to-be-transmitted datum ⎤─S101 inquiring an idle-internal-memory datum of the second accelerator card in the first accelerator card itself ⎤─S102 by using the direct-memory-access controller of the first accelerator card itself and the idle-internal-memory datum, writing the to-be-transmitted datum into an internal memory of the second accelerator card in a mode of direct memory access ⎤─S103

(56)     References Cited

U.S. PATENT DOCUMENTS

| | | | | |
|---|---|---|---|---|
| 10,977,104 | B2 * | 4/2021 | Chiou | G06F 8/656 |
| 11,119,671 | B2 * | 9/2021 | Cheng | G06F 3/0604 |
| 11,374,734 | B2 * | 6/2022 | Cheng | H04L 9/12 |
| 11,693,970 | B2 * | 7/2023 | Liu | G06F 21/575 |
| | | | | 726/2 |
| 12,229,566 | B2 * | 2/2025 | Ravi | G06F 9/541 |
| 2019/0213029 | A1 * | 7/2019 | Liu | G06F 9/45558 |
| 2019/0319933 | A1 * | 10/2019 | Jiang | G06F 9/5083 |
| 2022/0413918 | A1 | 12/2022 | Ren et al. | |
| 2026/0004143 | A1 * | 1/2026 | Charif | G06N 3/092 |

FOREIGN PATENT DOCUMENTS

| | | |
|---|---|---|
| CN | 114764374 A | 7/2022 |
| CN | 116303141 A | 6/2023 |
| CN | 117033275 A | 11/2023 |
| WO | 2023015780 A1 | 2/2023 |

* cited by examiner

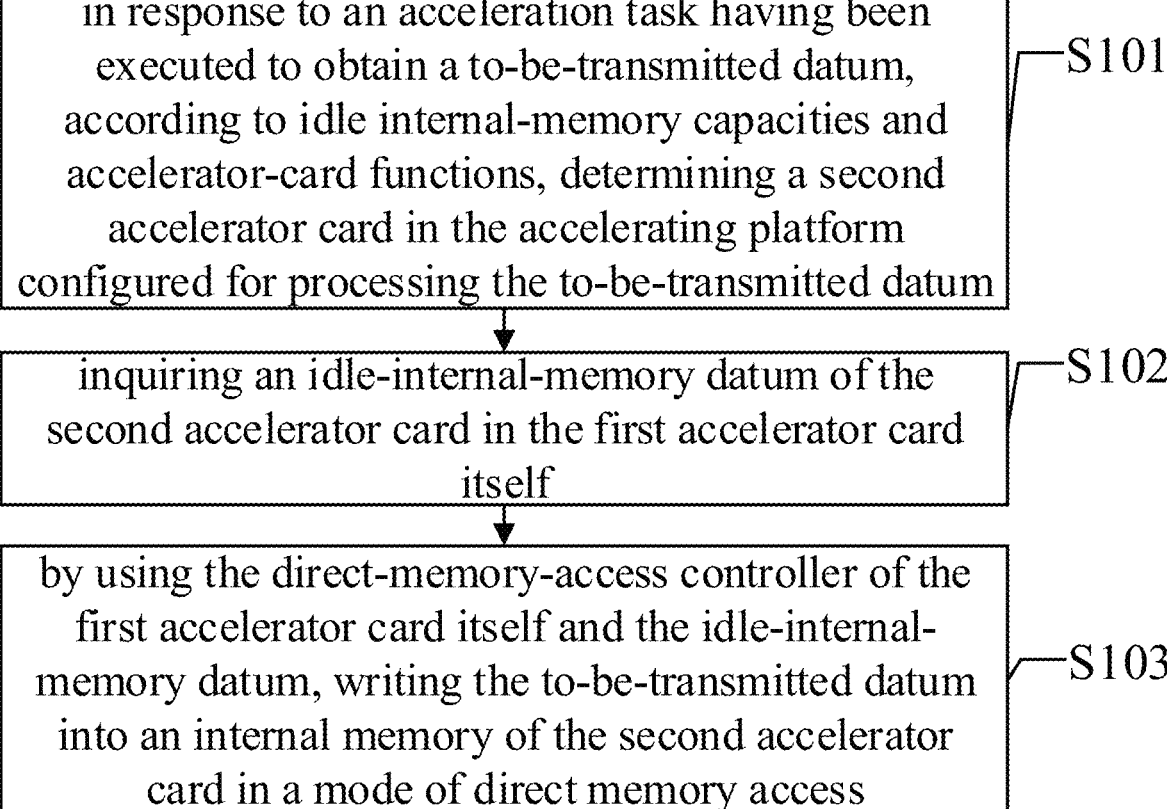

in response to an acceleration task having been executed to obtain a to-be-transmitted datum, according to idle internal-memory capacities and accelerator-card functions, determining a second accelerator card in the accelerating platform configured for processing the to-be-transmitted datum — S101 inquiring an idle-internal-memory datum of the second accelerator card in the first accelerator card itself — S102 by using the direct-memory-access controller of the first accelerator card itself and the idle-internal-memory datum, writing the to-be-transmitted datum into an internal memory of the second accelerator card in a mode of direct memory access — S103

FIG. 1 receiving a data message sent by the downstream device connected to any downstream interface of the accelerator card ⟋—S201 if the destination address of the data message is within a network route window, according to current-protocol information in a network register, determining the upstream transmission protocol, converting the data message into an upstream message that meets the upstream transmission protocol, and sending the upstream message to an upstream device via an upstream interface ⟋—S202 in response to the destination address of the data message being within a forwarding route window of a destination interface, via the destination interface, forwarding the data message to a downstream device connected to the destination interface, wherein the destination interface refers to at least one of the other downstream interfaces ⟋—S203

FIG. 2

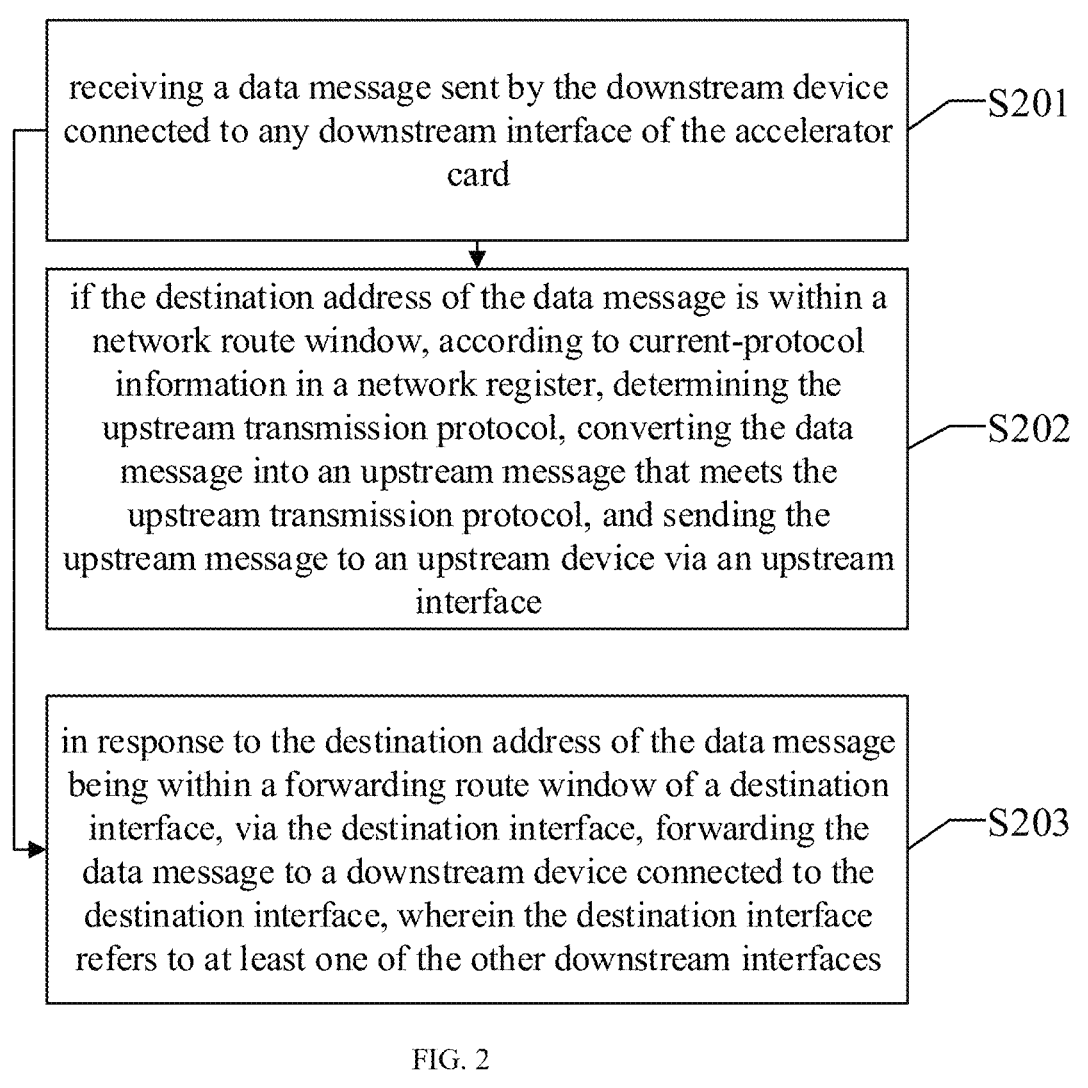

METHOD AND APPARATUS FOR DMA BETWEEN ACCELERATOR CARDS, AND ACCELERATOR CARD, ACCELERATION PLATFORM AND MEDIUM

CROSS-REFERENCE TO RELATED APPLICATION

The present application claims the priority of the Chinese patent application filed on Oct. 7, 2023 before the Chinese Patent Office with the application number of 202311279391.0 and the title of "METHOD AND APPARATUS FOR DMA BETWEEN ACCELERATOR CARDS, AND ACCELERATOR CARD, ACCELERATION PLATFORM AND MEDIUM", which is incorporated herein in its entirety by reference.

FIELD

The present application relates to the technical field of computers, and particularly relates to a method and apparatus of DMA between accelerator cards, an accelerator card, an accelerating platform and a non-volatile readable storage medium.

BACKGROUND

In an acceleration architecture formed by a mainframe and accelerator cards, DMA (Direct Memory Access) must be participated by the mainframe; in other words, the accelerator cards can merely perform the DMA with the mainframe. Furthermore, in the DMA between the accelerator card and the mainframe, it is required that the mainframe firstly determines the memory address of the data in the mainframe itself, and subsequently notifies the accelerator card, subsequently the accelerator card initiates the DMA to the mainframe, and subsequently the data can be emitted to the accelerator card, whereby the interaction process is tedious.

Therefore, how to simplify the DMA process and increase the efficiency of the DMA is a problem that a person skilled in the art requires solving.

SUMMARY

In view of the above, an object of the present application is to provide a method and apparatus of DMA between accelerator cards, an accelerator card, an accelerating platform and a non-volatile readable storage medium. The particular solutions are as follows:

The present application provides a method of DMA between accelerator cards, wherein the method is applied in a first accelerator card in a mainframe-free accelerating platform, and comprises:

in response to an acceleration task having been executed to obtain a to-be-transmitted datum, according to idle internal-memory capacities and accelerator-card functions, determining a second accelerator card in the accelerating platform configured for processing the to-be-transmitted datum, wherein each of accelerator cards in the accelerating platform is provided with a direct-memory-access controller;

inquiring an idle-internal-memory datum of the second accelerator card in the first accelerator card itself, wherein the second accelerator card broadcasts the idle-internal-memory datum in the accelerating platform in response to the idle internal-memory capacity being greater than a preset threshold; and by using the direct-memory-access controller of the first accelerator card itself and the idle-internal-memory datum, writing the to-be-transmitted datum into an internal memory of the second accelerator card in a mode of direct memory access.

According to some embodiments, the step of, according to the idle internal-memory capacities and the accelerator-card functions, determining the second accelerator card in the accelerating platform configured for processing the to-be-transmitted datum comprises:

preestimating a data-volume size of the to-be-transmitted datum; and determining the second accelerator card that has a function of processing the to-be-transmitted datum and the idle internal-memory capacity of which is not less than the data-volume size.

According to some embodiments, the step of determining the second accelerator card that has the function of processing the to-be-transmitted datum and the idle internal-memory capacity of which is not less than the data-volume size comprises:

inquiring data processing functions of the other accelerator cards than the first accelerator card in the accelerating platform, and selecting a candidate accelerator card the data processing function of which is the same as a next-step processing function of the to-be-transmitted datum; and determining at least one instance of the candidate accelerator card the idle internal-memory capacity of which is not less than the data-volume size to be the second accelerator card.

According to some embodiments, the method further comprises:

periodically broadcasting the storage-resource-usage datum of the first accelerator card itself to the other accelerator cards than the first accelerator card in the accelerating platform.

According to some embodiments, the method further comprises:

preestimating an internal-memory amount required by the execution of the acceleration task, and in response to a difference between a current idle internal-memory capacity of the first accelerator card itself and the internal-memory amount being greater than a preset threshold, broadcasting a storage-resource-usage datum of the first accelerator card itself to the other accelerator cards than the first accelerator card in the accelerating platform.

According to some embodiments, the method further comprises:

receiving storage-resource-usage data broadcasted by the other accelerator cards than the first accelerator card in the accelerating platform, wherein each of the other accelerator cards broadcasts the storage-resource-usage datum containing the idle-internal-memory datum in the accelerating platform in response to the idle internal-memory capacity being greater than the preset threshold; and according to the storage-resource-usage data, updating the idle-internal-memory data of the other accelerator cards that the first accelerator card itself stores.

According to some embodiments, the step of, by using the direct-memory-access controller of the first accelerator card itself and the idle-internal-memory datum, writing the to-betransmitted datum into the internal memory of the second accelerator card in the mode of direct memory access comprises:

by using the direct-memory-access controller of the first accelerator card itself, according to the idle-internal-memory datum and a memory address occupied by the to-be-transmitted datum in the first accelerator card itself, constructing descriptor information;

according to the descriptor information, constructing the to-be-transmitted datum into a first message; and sending the first message to the second accelerator card, whereby the second accelerator card writes the to-be-transmitted datum in the first message into the internal memory of the second accelerator card itself.

According to some embodiments, the step of, by the second accelerator card, writing the to-be-transmitted datum in the first message into the internal memory of the second accelerator card itself comprises:

by the second accelerator card, in response to the second accelerator card having determined that a data-writing address of the first message falls within a memory-address range, writing the to-be-transmitted datum in the first message into the internal memory of the second accelerator card itself.

According to some embodiments, the method further comprises:

receiving a second message and converting the second message into a target format;

in response to it being determined that a data-writing address of the second message falls within a register-address range, writing a datum in the second message into a register of the first accelerator card itself; and by using the datum in the register, configuring an entry of an address mapping table, and/or modifying a period of broadcasting of a storage-resource-usage datum.

According to some embodiments, the method further comprises:

in response to it being determined that the data-writing address of the second message falls within a memory-address range, writing the datum in the second message into an internal memory of the first accelerator card itself.

According to some embodiments, the method further comprises:

receiving a direct-memory-access request sent by an external mainframe;

inquiring, in the address mapping table, a memory address corresponding to a virtual address in the direct-memory-access request; and according to the memory address, completing the direct-memory-access request.

According to some embodiments, the method further comprises:

if the to-be-transmitted datum is the final result of the acceleration task, sending the to-be-transmitted datum to an external mainframe.

According to some embodiments, the method further comprises:

receiving the acceleration task sent by the external mainframe via an exchange network.

According to some embodiments, a downstream interface of the first accelerator card is a root-device-mode interface or slave-device-mode interface that supports a serial computer expansion bus standard, and a bus-address range of the downstream interface is not less than a bus-address range of a downstream device connected thereto.

According to some embodiments, the downstream interface is configured by:

by using an upstream interface of the first accelerator card, receiving a configuring message of the downstream interface;

converting the configuring message into a second message that meets the serial computer expansion bus standard;

according to the second message, configuring the bus-address range of the downstream device, and configuring identifier information for the downstream device; and according to the second message, performing bus-address configuring to a root-device core or slave-device core of the downstream interface, whereby the bus-address range of the downstream interface is not less than the bus-address range of the downstream device.

According to some embodiments, before the step of, according to the second message, performing bus-address configuring to the slave-device core of the downstream interface, the method further comprises converting the second message into a data format that matches with the slave-device mode.

According to some embodiments, the downstream interface is a plurality of downstream interfaces; and the method further comprises:

receiving a data message sent by a downstream device connected to any instance of the downstream interfaces;

in response to a destination address of the data message being not within a network route window, determining whether the destination address of the data message is within a forwarding route window of the other downstream interfaces; and in response to the destination address of the data message being within a forwarding route window of a destination interface, via the destination interface, forwarding the data message to a downstream device connected to the destination interface, wherein the destination interface refers to at least one of the other downstream interfaces.

The present application provides an apparatus of DMA between accelerator cards, wherein the apparatus is applied in a first accelerator card in a mainframe-free accelerating platform, and comprises:

a determining module configured for, in response to an acceleration task having been executed to obtain a to-be-transmitted datum, according to idle internal-memory capacities and accelerator-card functions, determining a second accelerator card in the accelerating platform configured for processing the to-be-transmitted datum, wherein each of accelerator cards in the accelerating platform is provided with a direct-memory-access controller;

an inquiring module configured for inquiring an idle-internal-memory datum of the second accelerator card in the first accelerator card itself, wherein the second accelerator card broadcasts the idle-internal-memory datum in the accelerating platform in response to the idle internal-memory capacity being greater than a preset threshold; and an accessing module configured for, by using the direct-memory-access controller of the first accelerator card itself and the idle-internal-memory datum, writing the to-be-transmitted datum into an internal memory of the second accelerator card in a mode of direct memory access.

The present application provides an accelerator card, wherein the accelerator card is configured for implementing the method according to any one of the above embodiments, and the accelerator card is provided with a direct-memory-access controller, a storage-resource register, a selecting module and an internal memory;

the selecting module, according to idle internal-memory capacities and accelerator-card functions, determines another accelerator card configured for processing a to-be-transmitted datum obtained by execution of an acceleration task, and inquires an idle-internal-memory datum of the another accelerator card;

the another accelerator card broadcasts the idle-internal-memory datum in the accelerating platform in response to the idle internal-memory capacity being greater than a preset threshold;

the storage-resource register stores the idle-internal-memory datum of the another accelerator card; and the direct-memory-access controller, according to the idle-internal-memory datum, writes the to-be-transmitted datum into the internal memory of the another accelerator card in a mode of direct memory access.

According to some embodiments, the accelerator card is an FPGA (Field Programmable Gate Array) accelerator card, an ASIC (Application Specific Integrated Circuit) accelerator card or a multi-core processor.

The present application provides an accelerating platform, wherein the accelerating platform comprises a plurality of accelerator cards stated above, and the different instances of the accelerator cards are connected by expanding devices;

each of the accelerator cards is provided with a direct-memory-access controller, a storage-resource register, a selecting module and an internal memory;

the selecting module, according to idle internal-memory capacities and accelerator-card functions, determines another accelerator card configured for processing a to-be-transmitted datum obtained by execution of an acceleration task, and inquires an idle-internal-memory datum of the another accelerator card;

the another accelerator card broadcasts the idle-internal-memory datum in the accelerating platform in response to the idle internal-memory capacity being greater than a preset threshold;

the storage-resource register stores the idle-internal-memory datum of the another accelerator card; and the direct-memory-access controller, according to the idle-internal-memory datum, writes the to-be-transmitted datum into the internal memory of the another accelerator card in a mode of direct memory access.

According to some embodiments, the selecting module further comprises a preestimating unit and a selecting unit;

the preestimating unit preestimates a data-volume size of the to-be-transmitted datum; and the selecting unit inquires data processing functions of other accelerator cards, and selects an accelerator card the data processing function of which is the same as a next-step processing function of the to-be-transmitted datum and the idle internal-memory capacity of which is not less than the data-volume size.

According to some embodiments, each of the accelerator cards is further provided with a resource-sharing module, the resource-sharing module preestimates an internal-memory amount required by the execution of the acceleration task, and in response to a difference between the idle internal-memory capacity of the internal memory and the internal-memory amount being greater than a preset threshold, broadcasts a storage-resource-usage datum of the internal memory to the other accelerator cards;

in response to the accelerator card being in an idle state, in response to the idle internal-memory capacity of the internal memory being greater than a preset threshold, the resource-sharing module broadcasts the storage-resource-usage datum of the internal memory to the other accelerator cards; and the resource-sharing module receives the storage-resource-usage data containing the idle-internal-memory data that are broadcasted by the other accelerator cards in the accelerating platform in response to the idle internal-memory capacity being greater than the preset threshold, and, according to the storage-resource-usage data, updates the idle-internal-memory data of the other accelerator cards that the storage-resource register stores.

The present application provides a non-volatile readable storage medium, wherein the non-volatile readable storage medium is configured for storing a computer program, and the computer program, when executed by a processor, implements the method according to any one of the above embodiments.

It can be known from the above solutions that the present application provides a method of DMA between accelerator cards, wherein the method is applied in a first accelerator card in a mainframe-free accelerating platform, and comprises: in response to an acceleration task having been executed to obtain a to-be-transmitted datum, according to idle internal-memory capacities and accelerator-card functions, determining a second accelerator card in the accelerating platform configured for processing the to-be-transmitted datum, wherein each of accelerator cards in the accelerating platform is provided with a direct-memory-access controller; inquiring an idle-internal-memory datum of the second accelerator card in the first accelerator card itself, wherein the second accelerator card broadcasts the idle-internal-memory datum in the accelerating platform in response to the idle internal-memory capacity being greater than a preset threshold; and by using the direct-memory-access controller of the first accelerator card itself and the idle-internal-memory datum, writing the to-be-transmitted datum into an internal memory of the second accelerator card in a mode of direct memory access.

It can be seen that the advantageous effect of the present application is that the first accelerator card, as the data source terminal, initiatively performs the initiation of the DMA, and, according to the idle-internal-memory datum of the second accelerator card as the data destination terminal recorded in the first accelerator card itself, writes the datum directly into the internal memory of the second accelerator card in the mode of DMA, which does not require inquiring the idle-internal-memory address of the second accelerator card before the DMA, and does not require waiting for the second accelerator card to initiate the DMA. The solution realizes the direct DMA writing operation between different accelerator cards at the hardware level, which simplifies the DMA process, and increases the efficiency of the DMA.

Correspondingly, the apparatus of DMA between accelerator cards, the accelerator card, the accelerating platform and the non-volatile readable storage medium according to the present application also have the above technical effects.

BRIEF DESCRIPTION OF THE DRAWINGS

In order to more clearly illustrate the technical solutions of the embodiments of the present application or the prior art, the figures that are required to describe the embodiments or the prior art will be briefly described below. Apparently, the figures that are described below are merely embodiments of the present application, and a person skilled in the art can obtain other figures according to the provided figures without paying creative work.

FIG. 1 is a flow chart of a method of DMA between accelerator cards according to the present application;

FIG. 2 is a flow chart of a data-transmission method according to the present application;

DETAILED DESCRIPTION

Figure 3:
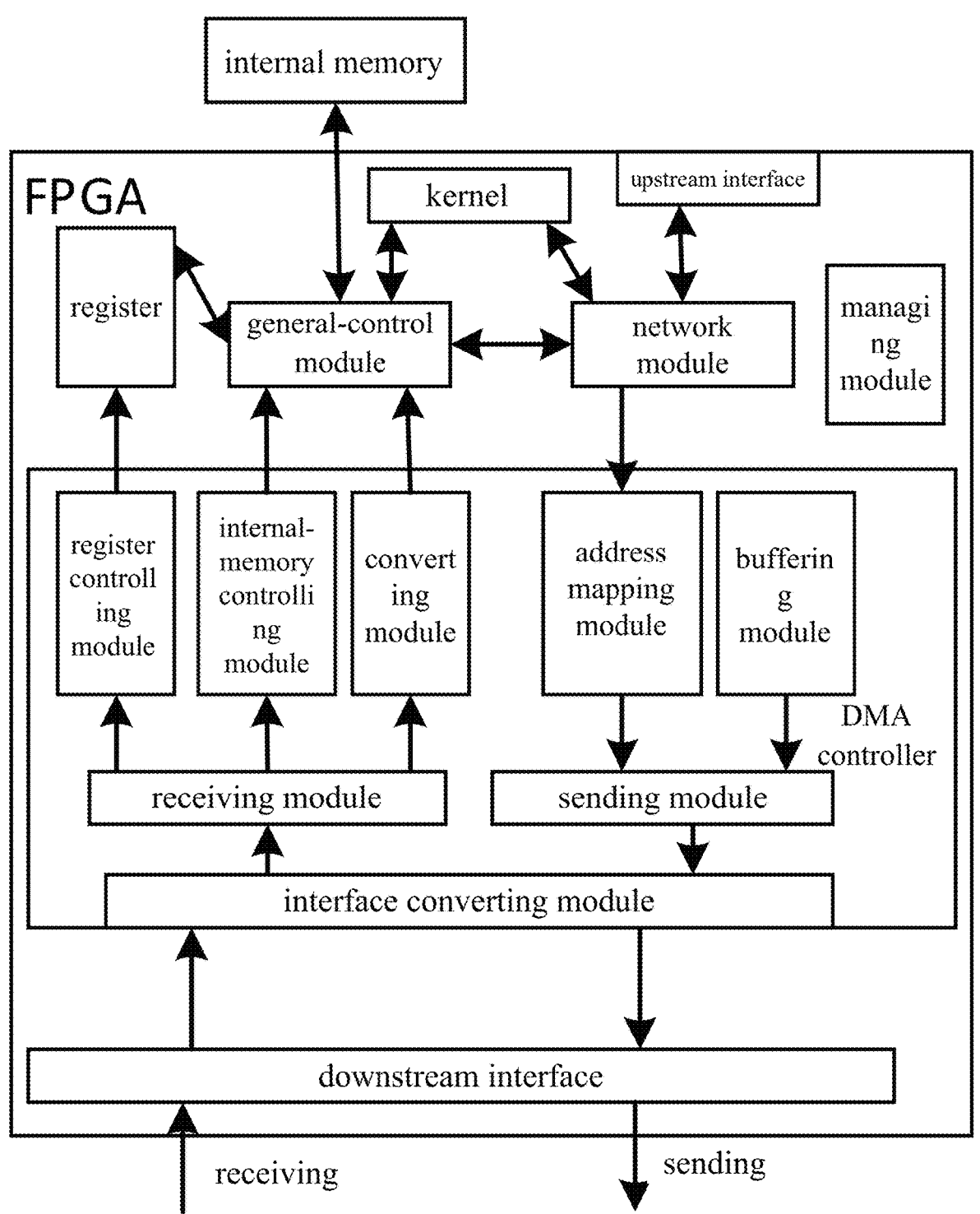
FIG. 3 is a schematic diagram of the DMA function of an FPGA accelerator card according to the present application.

The technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

Currently, in an acceleration architecture formed by a mainframe and accelerator cards, DMA (Direct Memory Access) must be participated by the mainframe; in other words, the accelerator cards can merely perform the DMA with the mainframe. Furthermore, in the DMA between the accelerator card and the mainframe, it is required that the mainframe firstly determines the memory address of the data in the mainframe itself, and subsequently notifies the accelerator card, subsequently the accelerator card initiates the DMA to the mainframe, and subsequently the data can be emitted to the accelerator card, whereby the interaction process is tedious. In view of the above, the present application provides a solution of DMA between accelerator cards, which may realize the direct DMA writing operation between different accelerator cards at the hardware level, which simplifies the DMA process, and increases the efficiency of the DMA.

Referring to FIG. 1, an embodiment of the present application discloses a method of DMA between accelerator cards, wherein the method is applied in a first accelerator card in a mainframe-free accelerating platform, and comprises:

S101: in response to an acceleration task having been executed to obtain a to-be-transmitted datum, according to idle internal-memory capacities and accelerator-card functions, determining a second accelerator card in the accelerating platform configured for processing the to-be-transmitted datum.

In the embodiments of the present application, the mainframe-free accelerating platform may receive an acceleration task sent by an external mainframe, for example, an image recognition task and an encryption or decryption task. Generally, the same one acceleration task may be allocated to different accelerator cards in the accelerating platform. For example, a first accelerator card executes a table looking-up operation in the acceleration task, and a second accelerator card performs a logical-operation operation on the result of the table looking-up operation to obtain the processing result of the entire task. Both of the first accelerator card and the second accelerator card may be plural.

It should be noted that the acceleration task is sent to the first accelerator card by an external mainframe via an exchange network. The first accelerator card may firstly execute the leading operation in the acceleration task (for example, the above-described table looking-up operation), and may also execute the tailing operation in the acceleration task (for example, the above-described logical-operation operation). If the first accelerator card executes the tailing operation in the acceleration task, then the to-be-transmitted datum is the final result of the acceleration task, and therefore the to-be-transmitted datum is sent to an external mainframe, and does not require being subsequently processed by another accelerator card.

In an alternative embodiment, the step of, according to the idle internal-memory capacities and the accelerator-card functions, determining the second accelerator card in the accelerating platform configured for processing the to-be-transmitted datum comprises: preestimating a data-volume size of the to-be-transmitted datum; and determining the second accelerator card that has a function of processing the to-be-transmitted datum and the idle internal-memory capacity of which is not less than the data-volume size. The step of determining the second accelerator card that has the function of processing the to-be-transmitted datum and the idle internal-memory capacity of which is not less than the data-volume size comprises: inquiring data processing functions of the other accelerator cards than the first accelerator card in the accelerating platform, and selecting a candidate accelerator card the data processing function of which is the same as a next-step processing function of the to-be-transmitted datum; and determining at least one instance of the candidate accelerator card the idle internal-memory capacity of which is not less than the data-volume size to be the second accelerator card. Accordingly, it can be seen that the second accelerator card is an accelerator card that has the function of processing the to-be-transmitted datum and whose residual internal-memory capacity is sufficiently large. If the next-step processing function of the to-be-transmitted datum is encryption, then the accelerator-card function is encryption, and accordingly the second accelerator card is required to be able to execute the encryption operation. If an accelerator card can merely perform a decryption operation, then the accelerator-card function is decryption, and accordingly that accelerator card is not selected to be the candidate accelerator card.

Each of the accelerator cards in the accelerating platform is provided with a direct-memory-access controller (i.e., DMA controller).

S102: inquiring an idle-internal-memory datum of the second accelerator card in the first accelerator card itself.

The second accelerator card broadcasts the idle-internal-memory datum in the accelerating platform in response to the idle internal-memory capacity being greater than a preset threshold.

It should be noted that each of the accelerator cards in the accelerating platform records the storage-resource-usage data of the other accelerator cards in the accelerating platform. The storage-resource-usage datum contains the data such as the initial address of the idle internal memory and the total internal-memory capacity. Therefore, in an alternative embodiment, the first accelerator card periodically broadcasts the storage-resource-usage datum of the first accelerator card itself to the other accelerator cards than the first accelerator card in the accelerating platform. The first accelerator card receives the storage-resource-usage data broadcasted by the other accelerator cards than the first accelerator card in the accelerating platform; and according to the storage-resource-usage data, updates the idle-internal-memory data of the other accelerator cards that the first accelerator card itself stores. The idle-internal-memory datum is particularly the initial address of the idle internal memory. The second accelerator card or the other accelerator cards may be an accelerator card connected to the first accelerator card by an expanding device, and may also be a downstream device connected to any of downstream interfaces of the first accelerator card.

In an example, the first accelerator card may preestimate the internal-memory amount required by the execution of the acceleration task, and if the difference between the current idle internal-memory capacity of the first accelerator card itself and the internal-memory amount is greater than a preset threshold, broadcast the storage-resource-usage datum of the first accelerator card itself to the other accelerator cards than the first accelerator card in the accelerating platform; and if the first accelerator card is in an idle state, when the current idle internal-memory capacity of the first accelerator card itself is greater than a preset threshold, broadcast the storage-resource-usage datum of the first accelerator card itself to the other accelerator cards than the first accelerator card in the accelerating platform. Correspondingly, the storage-resource-usage data that are broadcasted by the other accelerator cards and received by the first accelerator card are broadcasted by the other accelerator cards when their idle internal-memory capacity is greater than the preset threshold, wherein the storage-resource-usage datum contains the idle-internal-memory datum.

S103: by using the direct-memory-access controller of the first accelerator card itself and the idle-internal-memory datum, writing the to-be-transmitted datum into an internal memory of the second accelerator card in a mode of direct memory access.

In an alternative embodiment, the step of, by using the direct-memory-access controller of the first accelerator card itself and the idle-internal-memory datum, writing the to-be-transmitted datum into the internal memory of the second accelerator card in the mode of direct memory access comprises: by using the direct-memory-access controller of the first accelerator card itself, according to the idle-internal-memory datum and a memory address occupied by the to-be-transmitted datum in the first accelerator card itself, constructing descriptor information; according to the descriptor information, constructing the to-be-transmitted datum into a first message; and sending the first message to the second accelerator card, whereby the second accelerator card writes the to-be-transmitted datum in the first message into the internal memory of the second accelerator card itself. The step of, by the second accelerator card, writing the to-be-transmitted datum in the first message into the internal memory of the second accelerator card itself comprises: by the second accelerator card, in response to the second accelerator card having determined that a data-writing address of the first message falls within a memory-address range, writing the to-be-transmitted datum in the first message into the internal memory of the second accelerator card itself. The first message is particularly a TLP (Transaction Layer Packet) message. The different accelerator cards communicate by using PCIE (Peripheral Component Interconnect Express, a high-speed serial computer expansion bus standard). The mode of direct memory access is the DMA mode.

In the embodiments of the present application, the first accelerator card receives a second message (a message for configuring the register) and converts the second message into a target format (for example, PCIE Stream, or the PCIE stream mode); if it is determined that the data-writing address of the second message falls within a register-address range, writes the datum in the second message into a register of the first accelerator card itself; by using the datum in the register, configures an entry of an address mapping table, and/or modifies the period of broadcasting of a storage-resource-usage datum; and if it is determined that the data-writing address of the second message falls within a memory-address range, writes the datum in the second message into the internal memory of the first accelerator card itself.

The entry in the address mapping table is a mapping between the virtual address used by an external mainframe and the memory address. Therefore, in an alternative embodiment, the first accelerator card receives a direct-memory-access request sent by an external mainframe; inquires, in the address mapping table, a memory address corresponding to a virtual address in the direct-memory-access request; and according to the memory address, completes the direct-memory-access request. It can be seen that any of the accelerator cards according to the embodiments of the present application is able to perform direct memory access with the external mainframe.

Figure 13:
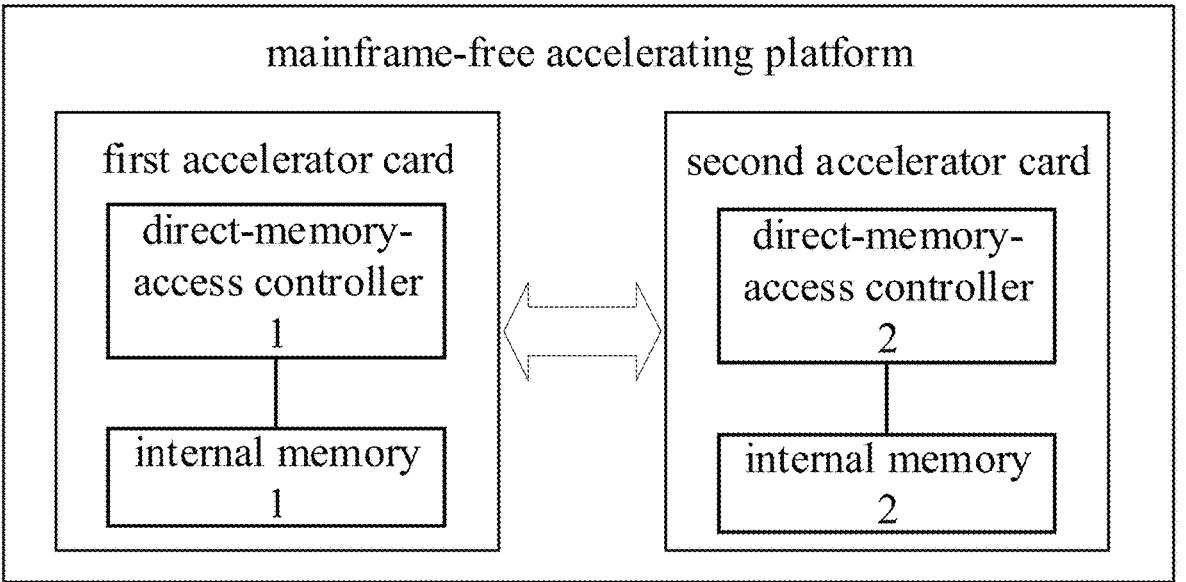
FIG. 13 is a schematic diagram of still another accelerating platform according to the present application.

Referring to the flow shown in FIG. 1, wherein the accelerating platform that it corresponds to may be seen in FIG. 13, in FIG. 13, the mainframe-free accelerating platform comprises a first accelerator card and a second accelerator card, both of the first accelerator card and the second accelerator card are provided with modules such as the direct-memory-access controller and the internal memory, and both of the first accelerator card and the second accelerator card can directly perform the DMA data transmission according to the flow shown in FIG. 1, and can directly perform DMA writing operation at the hardware level. Each of the first accelerator card and the second accelerator card stores the idle-internal-memory datum of the opposite side in the storage-resource register. The first accelerator card and the second accelerator card may be connected by an expanding device.

It can be seen that, in the embodiments of the present application, the first accelerator card, as the data source terminal, initiatively performs the initiation of the DMA, and, according to the idle-internal-memory datum of the second accelerator card as the data destination terminal recorded in the first accelerator card itself, writes the datum directly into the internal memory of the second accelerator card in the mode of DMA, which does not require inquiring the idle-internal-memory address of the second accelerator card before the DMA, and does not require waiting for the second accelerator card to initiate the DMA. The solution realizes the direct DMA writing operation between different accelerator cards at the hardware level, which simplifies the DMA process, and increases the efficiency of the DMA.

An embodiment of the present application discloses another data-transmission method, wherein the method is applied in any of the accelerator cards, a downstream interface of the accelerator card is a root-device-mode interface or slave-device-mode interface that supports a serial computer expansion bus standard (for example, PCIE), and the bus-address range of the downstream interface is not less than the bus-address range of the downstream device connected thereto. The PCIE interface of the accelerator card has a root-device mode (Root Port, RP) and a slave-device mode (End Point, EP). The current root-device mode and the current slave-device mode merely support one-to-one communication between the accelerator card and the device connected to its PCIE interface, does not support communication between an upstream device of the accelerator card and the device connected to the PCIE interface of the accelerator card, and do not support P2P (Peer-to-Peer) communication between the devices connected to different PCIE interfaces of the accelerator card.

Referring to FIG. 2, the data-transmission method according to the embodiments of the present application comprises:

S201: receiving a data message sent by the downstream device connected to any downstream interface of the accelerator card.

S202: if the destination address of the data message is within a network route window, according to current-protocol information in a network register, determining the upstream transmission protocol, converting the data message into an upstream message that meets the upstream transmission protocol, and sending the upstream message to an upstream device via an upstream interface.

S203: in response to the destination address of the data message being within a forwarding route window of a destination interface, via the destination interface, forwarding the data message to a downstream device connected to the destination interface, wherein the destination interface refers to at least one of the other downstream interfaces.

The other downstream interfaces and the downstream interface sending the data message are different downstream interfaces that belong to the same one accelerator card.

The step S202 according to the embodiments of the present application may enable the message that is sent by the downstream device to the accelerator card via the downstream interface to arrive at the upstream device connected to the upstream interface, to realize a downstream-to-upstream data passage. The step S203 according to the embodiments of the present application may enable the message that is sent by the downstream device to the accelerator card via a certain downstream interface to arrive at the downstream device connected to another downstream interface, to realize a data passage between the downstream devices connected to the different downstream interfaces of the same one accelerator card. Correspondingly, if the destination address of the data message is not within a network route window, and the destination address of the data message is not within the forwarding route window of any one of the downstream interfaces, then the data message is discarded.

In an embodiment of the present application, one accelerator card has a plurality of downstream interfaces, and any of the downstream interfaces is configured by: by using an upstream interface of the first accelerator card, receiving a configuring message of the downstream interface; converting the configuring message into a second message that meets the serial computer expansion bus standard; according to the second message, configuring the bus-address range of the downstream device, and configuring identifier information for the downstream device; and according to the second message, performing bus-address configuring to a root-device core or slave-device core of the downstream interface, whereby the bus-address range of the downstream interface is not less than the bus-address range of the downstream device. Before the step of, according to the second message, performing bus-address configuring to the slave-device core of the downstream interface, the method further comprises converting the second message into a data format that matches with the slave-device mode. The data format that matches with the slave-device mode is the type-0 format, and the data format that matches with the root-device mode is the type-1 format.

In an example, the step of, according to the second message, performing address configuring to the root-device core or slave-device core of the downstream interface comprises: according to the second message, configuring a bus register and an internal-memory-window register in the accelerator card, to configure the root-device core of the downstream interface; or converting the second message into a data format that matches with the slave-device mode, and, according to the second message that has been converted, configuring the bus address obtained by the conversion of the memory address of the downstream device to the slave-device core.

In the configuring of the IP address (Internet Protocol Address) of the downstream interface, command registers such as an enabling memory-space register, an IO (Input/Output) space register and a bus main-control register are configured, and a writing maximum-load-length register, a maximum-reading-request register and a strong-order-mode register are configured. In the initialization of the downstream interface, bus registers such as a root bus register, a sub-bus register and a maximum bus register are configured, an internal-memory-window register is configured, to set the data of the interface such as the prefetchable internal-memory range, the window base address of the un-prefetchable internal memory, and the window size, and the identifier information (BDF value) of the downstream device is configured. By now, the downstream interface can realize the Switch function based on the built-in root-device core. The capability configuration space register of general RP is at the root port (Root Port), while the capability configuration register of the Switch is at the Switch. The BDF (Bus Device Function) value refers to the bus number, the device number and the function number.

The process of configuring the built-in slave-device core of the downstream interface comprises firstly converting the TLP configuring message in the type-0 format into the type-1 format, and subsequently configuring the BDF register, to configure the identifier information for the downstream device of the current interface; subsequently configuring the BAR (bus) address (obtained by converting the memory address of the downstream device), to enable the current interface to read the memory address of the downstream device; subsequently configuring the command registers such as the enabling memory-space register, the IO space register and the bus main-control register; and configuring the writing maximum-load-length register, the maximum-reading-request register and the strong-order-mode register. By now, the downstream interface can realize the Switch function based on the built-in slave-device core.

In an alternative embodiment, the step of, according to the current-protocol information in the network register, determining the upstream transmission protocol comprises: reading the current-protocol information from the network register; and determining the protocol type corresponding to the current-protocol information to be the upstream transmission protocol. The network register stores the protocol information of the upstream transmission protocol that is currently used by the upstream device, and the user may flexibly modify the protocol information in the network register. In an example, in response to a protocol configuring operation inputted by the user, the protocol information configured in the protocol configuring operation is written into the network register, to modify the upstream transmission protocol that is currently used by the upstream device. The upstream transmission protocol is, for example, TCP (Transmission Control Protocol, a transport-layer communication protocol).

In the embodiments of the present application, all of the upstream interface and the downstream interfaces can be flexibly enabled and disenabled. Therefore, before the step of, according to the current-protocol information in the network register, determining the upstream transmission protocol, the method further comprises: enabling the upstream interface, and disenabling the other downstream interfaces, whereby the data message is emitted via the upstream interface. Correspondingly, before the step of, via the destination interface, forwarding the data message to the downstream device connected to the destination interface, the method further comprises: enabling the destination interface, and disenabling the upstream interface and the interfaces among the other downstream interfaces other than the destination interface, whereby the data message is emitted via the destination interface.

In an alternative embodiment, the accelerator card converts the data message received via the upstream interface into the second message that meets the serial computer expansion bus standard; and if the destination address of the second message is within the forwarding route window of at least one of the downstream interfaces, then, via the at least one of the downstream interfaces, forwards the second message to the downstream device connected to the at least one of the downstream interfaces. That may enable the message that is sent by the upstream device to the accelerator card via the upstream interface to arrive at the downstream device connected to the at least one of the downstream interfaces, to realize an upstream-to-downstream data passage. If the destination address of the second message is not within the forwarding route window of any one of the downstream interfaces, then the second message is discarded.

It can be seen that, in the embodiments of the present application, any of the downstream interfaces of any one of the accelerator cards applies the serial computer expansion bus standard, is configured to be a root-device-mode interface or slave-device-mode interface, and is configured to have a bus-address range that is not less than the bus-address range of the downstream device connected thereto. Accordingly, a downstream-to-upstream data passage, an upstream-to-downstream data passage and a data passage between the downstream devices connected to the different downstream interfaces of the accelerator card may be realized in the accelerator card, without using an expanding device. Furthermore, the type of the transmission protocol that is used upstream may be decided flexibly according to scene demands.

Taking an FPGA as the accelerator card as an example, the particular function implementation of enabling the FPGA to directly perform DMA writing at the hardware level will be described below. In the embodiments of the present application, the FPGA implements the P2P DMA function internally, and it may not only initiate the DMA request as the PCIE Master (master device), but also may, as a PCIE Slave (slave device), receive a P2P DMA request initiated by another PCIE device, which expands the usage scenarios. Because the operations are at the pure hardware level, the throughput performance is close to the theoretical performance of PCIE interfaces. The PCIE Master is the initiating terminal of the DMA request, the PCIE Slave is the receiving terminal of the DMA request, and, in the scene of P2P DMA, any one of the EPs may serve as the Master. The EP refers to the accelerator card. The P2P DMA refers to the DMA between one accelerator card and another accelerator card. The PCIE P2P DMA refers to the direct accessing between the memory-space data of two accelerator cards.

When the FPGA serves as the PCIE Master and performs the DMA with a GPU (graphics processing unit) accelerator card, the FPGA requires acquiring the address the GPU accelerator card, wherein the address of the GPU accelerator card is the physical address of the PCIE bus domain. In the DMA between the FPGA and the mainframe, because the mainframe uses a virtual address, it is required to, by using an address mapping module in the FPGA, convert the virtual address into the physical address of the PCIE bus domain. If the FPGA serves as the PCIE Slave, and another accelerator card GPU serves as the PCIE Master, then it is required to acquire the physical address of the PCIE bus domain of the FPGA, and the FPGA maps the memory space of itself to the PCIE bus of itself, whereby the GPU, when performing the DMA operation, directly uses the physical address of the PCIE bus domain of the FPGA.

Furthermore, the accelerator card serving as the PCIE Slave is further required to be able to parse a TLP message, distinguish the register reading-writing address and the DMA internal-memory reading-writing address in it, and send them to the corresponding modules to be processed separately.

As shown in FIG. 3, an FPGA that cannot only serve as the PCIE Master but also can serve as the PCIE Slave is required to be provided with a DMA controller internally. The DMA controller comprises an interface converting module, a receiving module, a register controlling module, an internal-memory controlling module, a converting module, an address mapping module, a buffering module and a sending module.

The interface converting module will be described. Because the PCIE user interfaces supplied by different FPGA manufacturers are not unified, the interface converting module may be provided in the FPGA, whereby all of the messages sent into the FPGA are in the PCIE ST format or the PCIE AXIS format (PCIE Advanced eXtensible Interface Stream, or PCIE AXIS stream mode). The PCIE user interface bus of the FPGA is in the PCIE ST format or the PCIE AXIS format. The PCIE ST bus is a PCIE interface standard bus, and therefore the messages sent into the FPGA are preferentially in the PCIE ST format.

Figure 4:
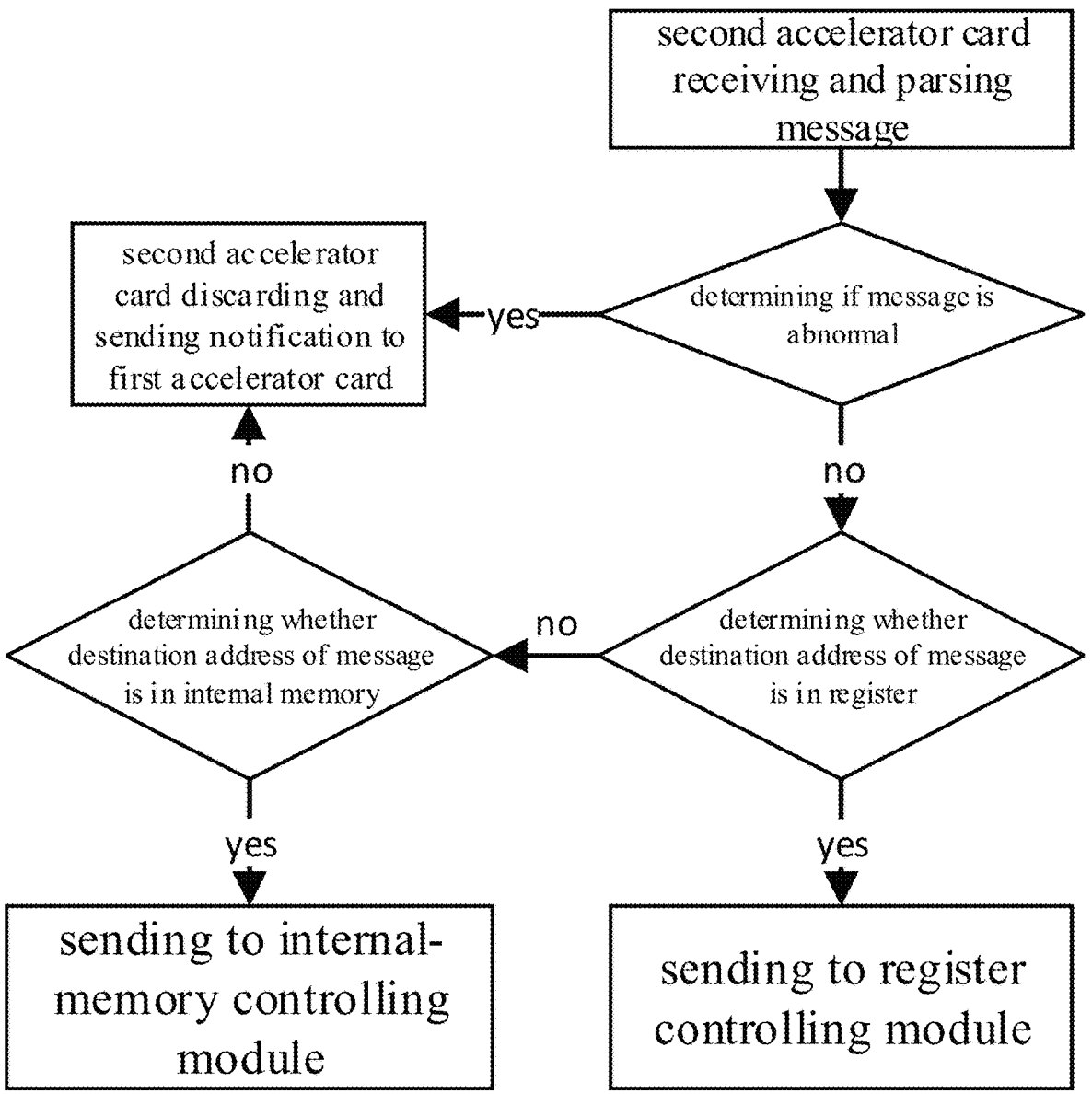
FIG. 4 is a schematic diagram of message parsing and judgement according to the present application.

The receiving module is configured for receiving and parsing the TLP message outputted by a PCIE EP core (hard core built in the downstream PCIE interface of the FPGA), and can discard abnormal messages. Regarding a TLP message that reads and writes a non-volatile readable storage medium, judgement is performed according to the address. If the address range is the register reading-writing address range, then the TLP is forwarded to the register controlling module to process. If the address range in the device memory-address range, then the TLP message is sent to the internal-memory controlling module to process. Regarding a completing message, it is sent to the converting module to process. The particular process may refer to FIG. 4.

The register controlling module can convert a register reading-writing controlling interface.

The internal-memory controlling module can control and convert the reading-writing controlling signal of the internal memory.

The converting module can perform the conversion of a register writing signal or internal-memory writing signal.

The address mapping module records the mapping from the virtual address to the physical address. This module is effective merely when the mainframe initiates the DMA operation, and at the other time the data are directly transmitted to the receiving module. The initialization configuring of the mapping table in the address mapping module is completed by the mainframe before the acceleration is applied.

The buffering module is configured for buffering the state of the FPGA internal-memory usage and the state of the idle internal memory.

Figure 5:
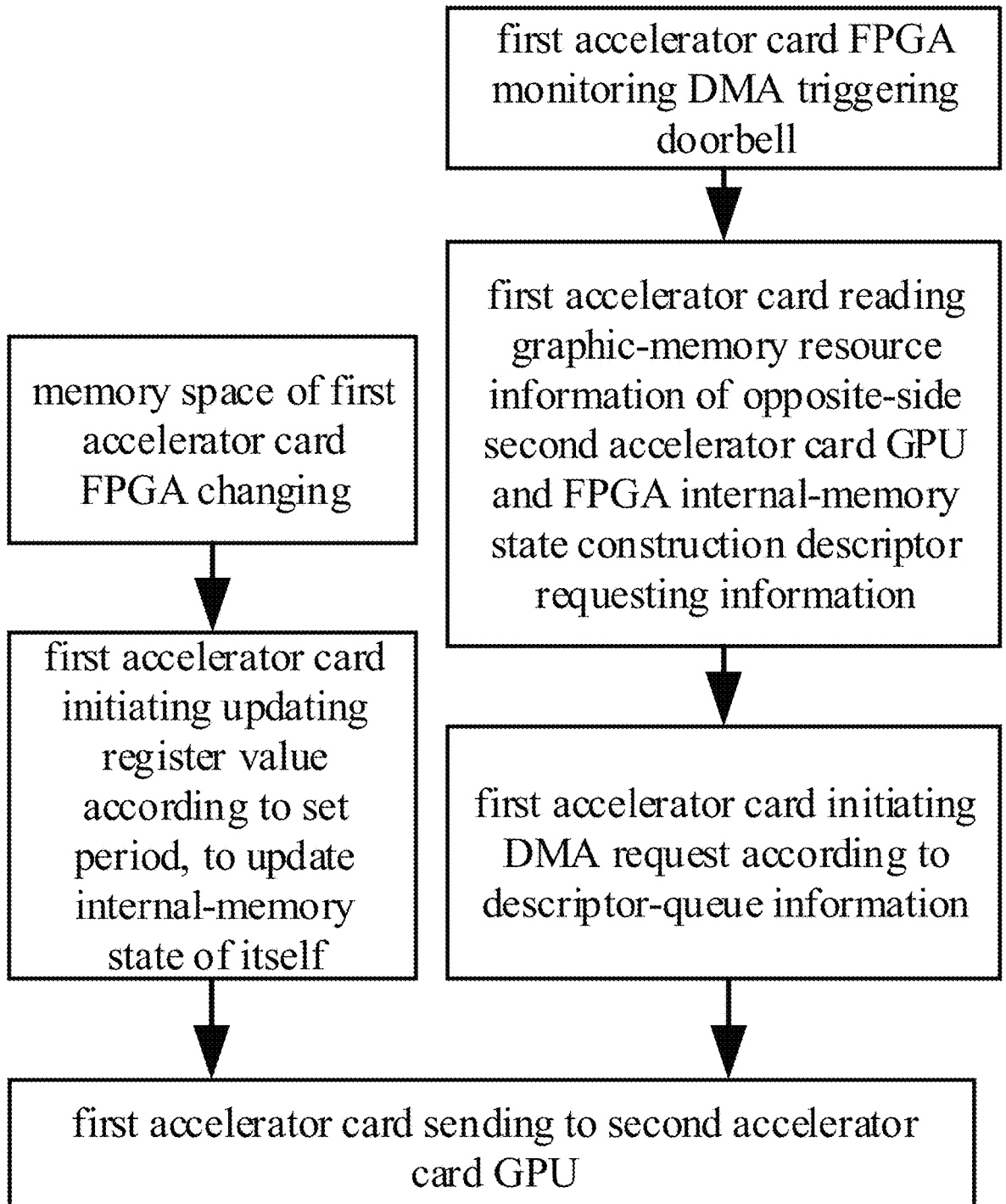
FIG. 5 is a schematic diagram of DMA triggering and internal-memory updating according to the present application.

The sending module can, according to a DMA triggering request inputted by a remote network or initiated by the kernel inside the FPGA, graphic-memory resource information of the opposite-side accelerator card GPU, and the FPGA internal-memory state construction descriptor requesting information, initiate the DMA requesting operation, and send the data to the GPU via the PCIE interface. In addition, the state of the FPGA internal-memory usage and the state of the idle internal memory are also sent to the opposite-side accelerator card GPU by this module via the PCIE interface of the FPGA. The particular process may refer to FIG. 5.

As shown in FIG. 3, besides the DMA controller, it is further required to implement a register, a general-control module, a network module and a managing module.

The register comprises a doorbell register of DMA, and a register for storing the resource information of the opposite-side accelerator card, which register is periodically written to record the remaining internal-memory resource of the opposite-side accelerator card.

The general-control module can complete the reading and writing of the interface of the internal memory of the FPGA. The internal memory of the FPGA is DDR (Double Data Rate, or dual-rate synchronous dynamic random access memory) or HBM (High Bandwidth Memory).

The network module is a network-message processing and controlling module, and can parse and process remotely inputted message information, comprising, if the message information is a data acceleration calculating signal, then sending it to the kernel module; if the message information is a DMA datum, then sending it to the address mapping module; and if the message information is a controlling signal, then sending it to the managing module. The kernel is the accelerating unit inside the FPGA board card, and can complete the acceleration functions such as network acceleration, calculation acceleration and storage acceleration.

The managing module can monitor the state of internal-memory resource usage inside the board card, and, via the network interface, detect the state of resource usage of the remote accelerator card.

Figure 6:
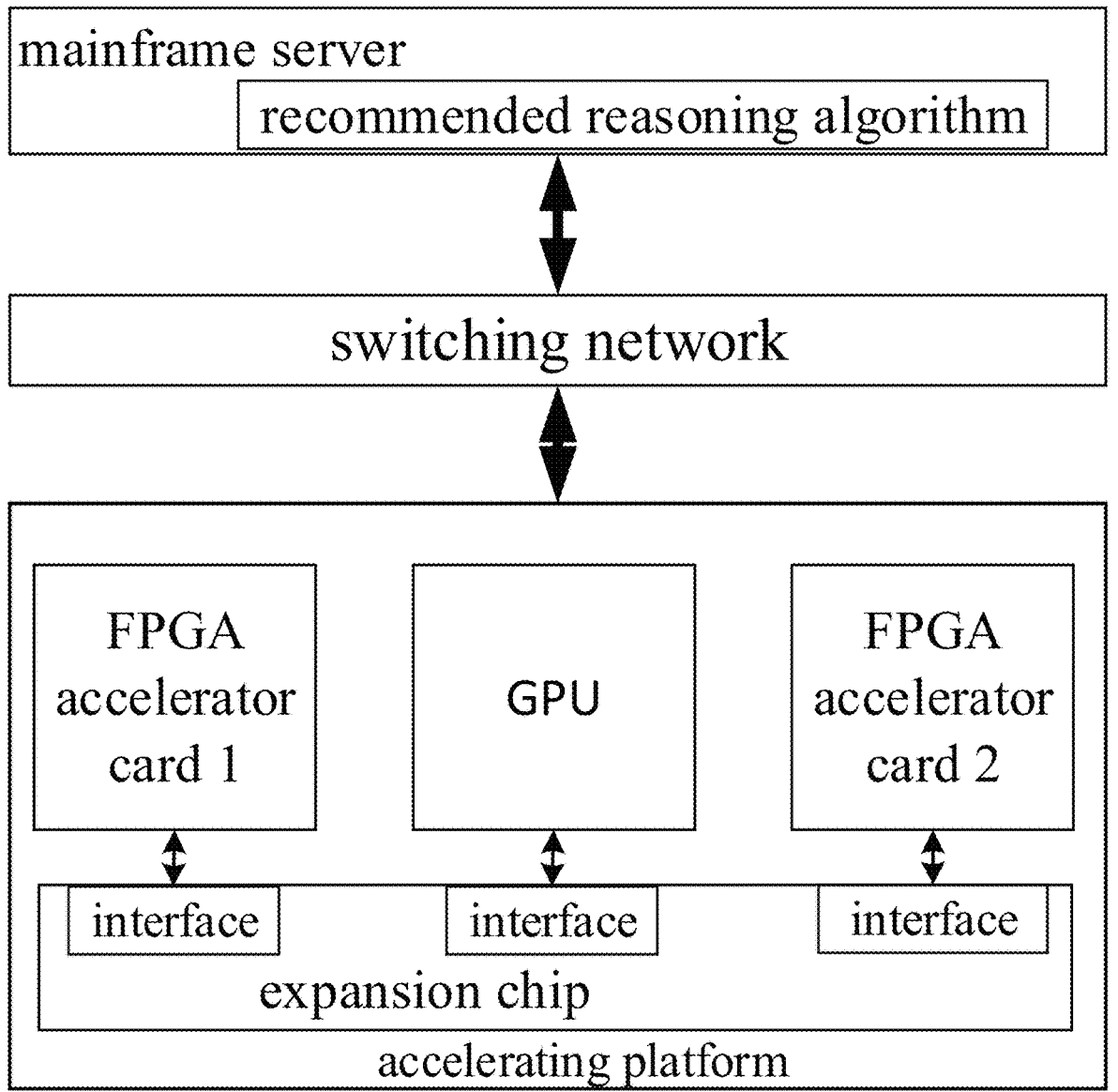
FIG. 6 is a schematic diagram of an accelerating system according to the present application.

The process of the DMA between the FPGA and the GPU and the joint completion of the acceleration task by the FPGA and the GPU will be described in detail below at the system level. Referring to FIG. 6, an accelerating platform comprises an FPGA accelerator card 1, an FPGA accelerator card 2 and one GPU accelerator card. Those three accelerator cards are connected by expanding devices (PCIE Switch), and DMA writing can be performed directly between each two of them, wherein the DMA has a low transmission delay, and during the DMA transmission the mainframe server is decoupled. The accelerating platform is connected to a mainframe server by an exchange network.

In the present example, it is assumed that the mainframe server uses the accelerating platform to accelerate a recommended reasoning algorithm, and the acceleration is completed by the FPGA accelerator cards and the GPU accelerator card jointly, wherein the FPGA accelerator cards complete the function of embedded-vector lookup table, and the GPU accelerator card completes the DNN (Deep Neural Network) calculation acceleration.

The process of the initialization of the system is as follows. Three downstream ports of the PCIE Switch initialize the PCIE interfaces of the two FPGA accelerator cards and one GPU accelerator card, to complete the configuring of the configuration space and the allocation of the BAR (bus) base address. In the accelerating platform, the three accelerator cards periodically broadcast the idle-internal-memory data of themselves via the PCIE interfaces. The PCIE Switch generally comprises one upstream port and a plurality of downstream ports, wherein the upstream port is connected to the CPU (Central Processing Unit), and the downstream ports are connected to PCIE devices. By using the PCIE Switch, the CPU can communicate with a plurality of PCIE devices, and the PCIE devices can realize P2P communication therebetween.

The process of the DMA between the accelerator cards of the system is as follows:

(1) The mainframe server sends the processed data required by the recommended reasoning algorithm to the FPGA accelerator card 1 and the FPGA accelerator card 2 via the network, so that the FPGA accelerator card 1 and the FPGA accelerator card 2 simultaneously perform the table looking-up calculation of the embedded vectors, wherein the parallelism accelerates the looking-up. The network modules of the FPGA accelerator card 1 and the FPGA accelerator card 2, after have received and processed the network-message information, send to the kernel modules to perform embedded table-looking-up processing.

(2) The data obtained after the table-looking-up processing has been completed are stored to the respective internal memories of the FPGA accelerator card 1 and the FPGA accelerator card 2, and subsequently the FPGA accelerator card 1 and the FPGA accelerator card 2 individually notify the sending modules of themselves to initiate the DMA writing operation. In each of the FPGA accelerator card 1 and the FPGA accelerator card 2, the sending module receives a DMA doorbell request initiated by the kernel, subsequently reads the value of the register storing the GPU internal-memory information, and reads the local internal-memory resource usage information to form a descriptor queue, to initiate the DMA writing operation, and form the data in the internal memory into the TLP message to send to the format converting module.

(3) In each of the FPGA accelerator card 1 and the FPGA accelerator card 2, the TLP message, via the format converting module, is sent to the PCIE EP core, to arrive at the PCIE Switch via the PCIE interface, and the PCIE Switch, according to the destination address of the TLP message, forwards to the GPU.

(4) The PCIE DMA controller inside the GPU receives the data sent by the two FPGA accelerator cards, and sends the received data to the graphic memory of itself, and subsequently the calculation core module in it starts the DNN calculation processing.

(5) After the GPU calculation has been completed, the DMA request is triggered. Because merely one FPGA card is required to complete the subsequent processing of the data that have been processed, the data are sent to the FPGA accelerator card 1 by default. The GPU, according to the idle internal memory of the FPGA accelerator card 1, performs DMA writing directly to the FPGA accelerator card 1.

(6) The PCIE Switch, after has received the DMA writing request of the GPU to the FPGA accelerator card 1, according to the destination address, forwards to the FPGA accelerator card 1, and the PCIE interface of the FPGA accelerator card 1, after processing, outputs the TLP message into the FPGA accelerator card 1.

(7) The FPGA accelerator card 1 receives and parses the TLP message, stores to the internal memory of itself by using the internal-memory controlling module, subsequently converts the data in the internal memory into a network message, and sends back to the mainframe server, to complete the acceleration processing of the recommended reasoning algorithm.

During the whole of the above acceleration process, the mainframe server is not required to perform any operation other than the sending of the original data and the receiving of the acceleration result, and the FPGA accelerator cards and the GPU accelerator card in the accelerating platform initiatively complete the controlling and processing. In both of the two times of P2P DMA process, the side that is to send the data initiatively initiates the DMA writing, and no other interaction is required during the process, which has a low delay and a high performance. According to some embodiments, the P2P DMA according to the embodiments of the present application, as compared with the conventional DMA process, reduces two times of the information interaction. In the conventional DMA process, firstly the GPU is required to inform the FPGA that the data have already been prepared, subsequently the FPGA initiates the DMA reading request to the GPU, and subsequently the data of the GPU can be sent to the FPGA. However, in the P2P DMA according to the embodiments of the present application, the GPU initiates the DMA writing directly to the FPGA, which does not require inquiring the idle-internal-memory address of the FPGA, and does not require waiting for the FPGA to initiate the DMA. Accordingly, the FPGA cannot only serve as the PCIE Master to initiate the internal-memory writing to the GPU, but also can serve as the PCIE Slave to complete the DMA writing initiated by the GPU, which has extensive usage scenarios, and supports the P2P DMA function in the real sense.

It can be seen that the embodiments of the present application enable the DMA process to decouple the mainframe server, and, by using the DMA controllers implemented inside the accelerator cards, enable the accelerator cards to not only be able to serve as the PCIE Master to initiate the DMA request, but also be able to, as a PCIE Slave, receive a DMA request initiated by another accelerator card, which expands the usage scenarios of DMA.

Moreover, because the DMA is realized by using a pure hardware address, the DMA performance is close to the theoretical performance of the PCIE interface. In addition, the accelerator cards can initiatively complete the creation of the descriptor queue, and trigger the DMA operation, which enables the delay performance and the throughput performance to be optimum, reduces the usage of the CPU of the mainframe server, and releases the valuable CPU resource.

Taking the case as an example in which the FPGA serves as the accelerator card, the process of the communication between the upstream device of the FPGA and the device connected to the PCIE interface of the FPGA, and the process of the P2P communication between the devices connected to the different PCIE interfaces of the FPGA, when the PCIE interface of the FPGA is in the root-device mode, will be described below.

According to some embodiments, the embodiments of the present application realize the function of PCIE Switch based on the PCIE RP hard core inside the FPGA, which can increase the utilization rate of the FPGA logical resource. The PCIE interfaces are configured in the RP mode, and it is merely required to modify the contents of the configuration space, before the function of PCIE Switch can be realized.

Figure 7:
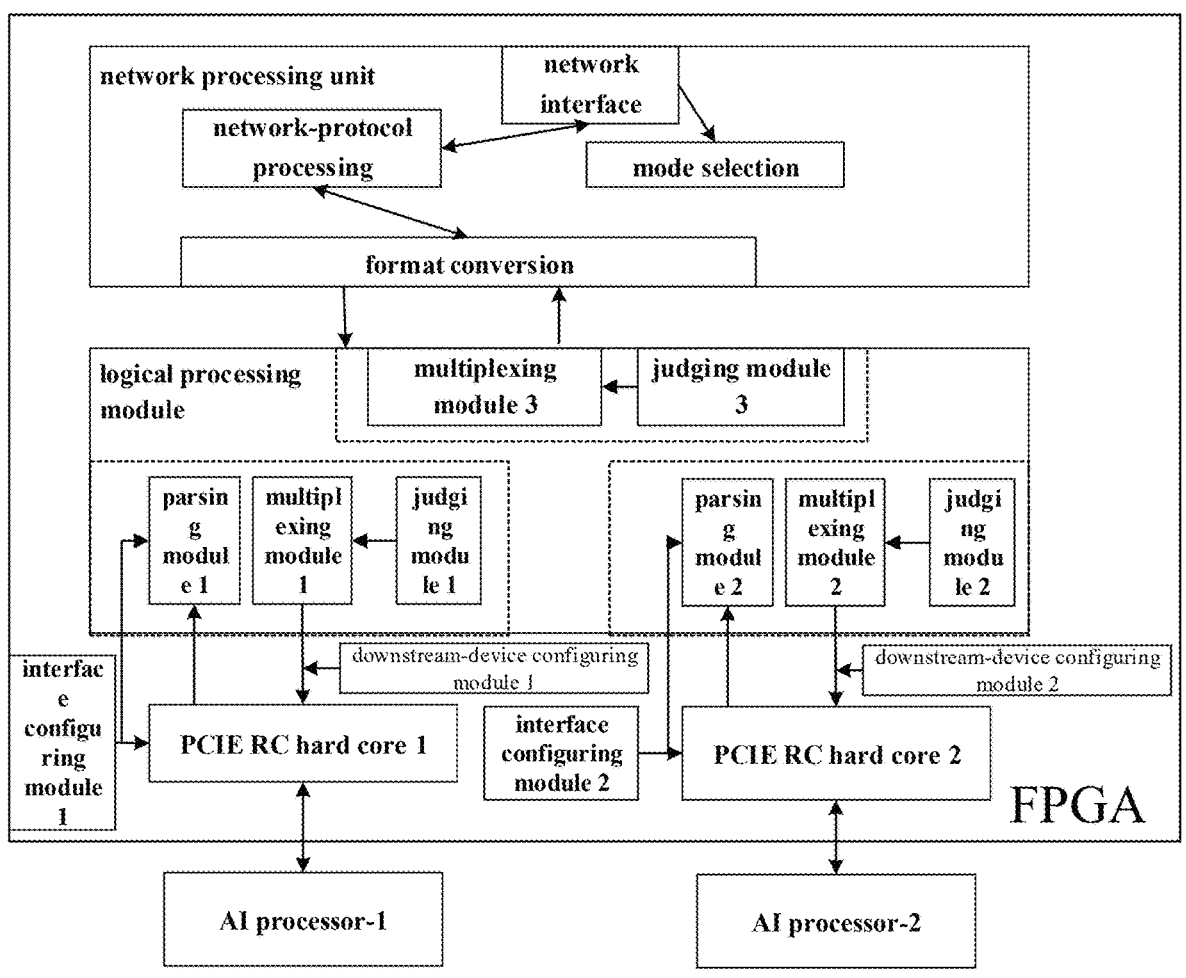
FIG. 7 is a schematic diagram of the Switch function of another FPGA accelerator card according to the present application.

Referring to FIG. 7, it is required to, based on the PCIE RP hard core inside the FPGA, implement an interface configuring module, a downstream-device configuring module, a logical processing module and a network module. The logical processing module is provided with a parsing module, a multiplexing module and a judging module for the network module and the two downstream PCIE interfaces. The FPGA in FIG. 7 has two downstream PCIE interfaces, and each of the downstream PCIE interfaces is provided with a PCIE RP hard core internally. Certainly, one accelerator card may have more or less downstream PCIE interfaces, and each of the downstream PCIE interfaces is connected to one downstream device.

Generally, the PCIE RP hard core provides three user interfaces, which are a user receiving bus, a user emitting bus and a configuration-space configuring bus. The user receiving bus and the user emitting bus are user interfaces for transmitting TLP messages. The configuration-space configuring bus may be used to complete the configuration-space configuring to PCIE RP, read the default register value of the configuration space, and output to the parsing module of the logical processing module to assist in the parsing and processing. The downstream-device configuring module, by using the initiated configuring TLP message, completes the initialization configuring of the configuration spaces of two processors, and the BAR base addresses of the two processors are configured to be BAR1 and BAR2. The interface configuring module, by using a cfg_mgnt bus (configuration management, or a controlling managing bus), completes the initialization configuring of the configuration spaces of two PCIE interfaces of the FPGA, and the BAR base addresses of the two PCIE interfaces are configured to be BAR3 and BAR4, wherein the address range of BAR3 is greater than or equal to the address range of BAR1, and the address range of BAR4 is greater than or equal to the address range of BAR2.

It can be seen that the downstream-device configuring module is configured for initializing the downstream EP devices. The interface configuring module is configured for performing the initialization configuring of the PCIE interfaces. The logical processing module is configured for implementing the forwarding and the controlling of TLP messages, and, for every single port, is provided with the parsing module, the multiplexing module and the judging module. The parsing module parses the TLP message outputted by the emitting bus of PCIE RP, outputs a judgement request according to the routing information, and at the same time processes abnormal TLP messages. The judging module receives the judgement request, and outputs a judgement signal, to select the corresponding sending passage for the message. The multiplexing module receives the data outputted by the parsing modules of the passages, and, according to the judgement signal, selects the suitable passage to send to the receiving bus of PCIE RP.

Moreover, the network module processes tasks related to the network interfaces. In the embodiments of the present application, the network module is connected to the upstream port of the FPGA. Multiple network transmission protocols are implemented inside the network module, for example, RDMA (Remote Direct Memory Access), TCP/IP, or a self-defining low-delay network protocol, and one of the network protocols is selected according to the mode configuration inputted by the user and outputted to the upstream device via the network interface. As stated above, the network module does not only support the PCIE protocol inside the FPGA, but also supports the external protocols such as RDMA and TCP/IP, and it can realize mutual conversion between the internal and external protocols. Referring to FIG. 7, when an externally supported protocol is selected, dynamic configuring may be performed by using a mode selecting switch, and the user sends a switch-register message selected by the configuration mode via the network interface. The upstream port of the Switch receives the message, parses message, extracts the corresponding mode selecting switch value, and configures to a mode selecting register module. Further, a network-protocol processing module, according to the value of the mode selecting register, performs the processing of the corresponding network protocol.

In the present example, the PCIE Switch comprises totally 3 passages, wherein two of the passages are connected to AI processors, and the other passage is connected to the network interface. The communication between the two processors connected to the two downstream interfaces of the FPGA will be described below. The AI processor-1 initiates the internal-memory accessing operation to the AI processor-2, wherein the destination address is BAR2. The DMA controller of the AI processor-1 initiates the operation, the operation message is firstly sent via the PCIE interface to the downstream port PCIE RP IP-1 corresponding to the FPGA PCIE Switch, and the PCIE RP IP-1 outputs and subsequently sends to the parsing module 1. The parsing module 1 parses the TLP message, and extracts the corresponding data such as the destination address. If the destination address is within the routing window of the PCIE IP-2, then an object-address judgement request is outputted to the judging modules of the ports, wherein in the present example the destination address is the address BAR2. be judging module 2 outputs an effective judgement enabling signal, and the other judging modules output ineffective enabling signals. According to the effective judgement signal, the TLP message is sent to the receiving bus of the PCIE RP IP-2, and subsequently sent to the AI processor-2 via the PCIE interface. The DMA controller of the AI processor-2 extracts the data of the TLP message and stores to the corresponding non-volatile readable storage medium. If the destination address of the TLP message is not within the range of the routing window (in other words, it is not within the routing window of the PCIE IP-2, and is not within the routing window of the network passage), or the TLP message is abnormal, then the message is discarded.

It should be noted that, by using the embodiments of the present application, each of the PCIE interfaces of the FPGA can be configured, to cause the PCIE interface to become a downstream interface of the PCIE Switch. Certainly, the network ports of the FPGA may also be configured to be the upstream interface of the Switch accordingly. Accordingly, the FPGA may be configured to realize the P2P communication between the AI processors, and realize the communication between the AI processors and the upstream network interface of the FPGA, without utilizing an expanding device or expansion card.

It can be seen that the embodiments of the present application can realize the function of PCIE Switch based on the built-in PCIE RP IP hard core of the FPGA, without utilizing an additional PCIE Switch, which has a low cost and simple implementation, and has a low utilization ratio of the FPGA logical resource. Moreover, the method may be applied in nearly all of FPGAs, with a good migratability. The method may be expanded to other PCIE processors, and if its PCIE interface has built-in PCIE RP IP, but does not support the PCIE Switch mode, then the downstream ports of the PCIE Switch may be implemented by using the PCIE RP IP, to realize the function of Switch forwarding. By using such implementations, the PCIE upstream port of the PCIE Switch may be configured to be implemented by using the built-in PCIE EP IP hard core of the accelerator card without adding the Switch. However, it should be noted that, in the EP mode, it is required to convert the format of the configuring TLP message for configuring the PCIE Switch from the type-0 format to the type-1 format, and the other configuration contents may refer to the configuration of the RP mode according to the present application. The IP (Intellectual property) hard core refers to the devices in the form of hardware modules.

An apparatus of DMA between accelerator cards according to the embodiments of the present application will be described below, and the apparatus of DMA between accelerator cards described below and the other embodiments described herein may refer to each other.

An embodiment of the present application discloses an apparatus of DMA between accelerator cards, wherein the apparatus is applied in a first accelerator card in a mainframe-free accelerating platform, and comprises:

a determining module configured for, in response to an acceleration task having been executed to obtain a to-be-transmitted datum, according to idle internal-memory capacities and accelerator-card functions, determining a second accelerator card in the accelerating platform configured for processing the to-be-transmitted datum, wherein each of accelerator cards in the accelerating platform is provided with a direct-memory-access controller;

an inquiring module configured for inquiring an idle-internal-memory datum of the second accelerator card in the first accelerator card itself, wherein the second accelerator card broadcasts the idle-internal-memory datum in the accelerating platform in response to the idle internal-memory capacity being greater than a preset threshold; and an accessing module configured for, by using the direct-memory-access controller of the first accelerator card itself and the idle-internal-memory datum, writing the to-be-transmitted datum into an internal memory of the second accelerator card in a mode of direct memory access.

In an alternative embodiment, the determining module is configured for:

preestimating a data-volume size of the to-be-transmitted datum; and determining the second accelerator card that has a function of processing the to-be-transmitted datum and the idle internal-memory capacity of which is not less than the data-volume size.

In an alternative embodiment, the determining module is configured for:

inquiring data processing functions of the other accelerator cards than the first accelerator card in the accelerating platform, and selecting a candidate accelerator card the data processing function of which is the same as a next-step processing function of the to-be-transmitted datum; and determining at least one instance of the candidate accelerator card the idle internal-memory capacity of which is not less than the data-volume size to be the second accelerator card.

In an alternative embodiment, the apparatus further comprises:

a broadcasting module configured for periodically broadcasting the storage-resource-usage datum of the first accelerator card itself to the other accelerator cards than the first accelerator card in the accelerating platform.

In an alternative embodiment, the broadcasting module is further configured for:

preestimating an internal-memory amount required by the execution of the acceleration task, and in response to a difference between a current idle internal-memory capacity of the first accelerator card itself and the internal-memory amount being greater than a preset threshold, broadcasting a storage-resource-usage datum of the first accelerator card itself to the other accelerator cards than the first accelerator card in the accelerating platform; and if it is in an idle state, when the current idle internal-memory capacity of the first accelerator card itself is greater than a preset threshold, broadcasting a storage-resource-usage datum of the first accelerator card itself to the other accelerator cards than the first accelerator card in the accelerating platform.

In an alternative embodiment, the apparatus further comprises:

an information updating module configured for receiving storage-resource-usage data broadcasted by the other accelerator cards than the first accelerator card in the accelerating platform, wherein each of the other accelerator cards broadcasts the storage-resource-usage datum containing the idle-internal-memory datum in the accelerating platform in response to the idle internal-memory capacity being greater than the preset threshold; and according to the storage-resource-usage data, updating the idle-internal-memory data of the other accelerator cards that the first accelerator card itself stores.

In an alternative embodiment, the accessing module is configured for:

by using the direct-memory-access controller of the first accelerator card itself, according to the idle-internal-memory datum and a memory address occupied by the to-be-transmitted datum in the first accelerator card itself, constructing descriptor information;

according to the descriptor information, constructing the to-be-transmitted datum into a first message; and sending the first message to the second accelerator card, whereby the second accelerator card writes the to-be-transmitted datum in the first message into the internal memory of the second accelerator card itself.

In an alternative embodiment, by the second accelerator card, in response to the second accelerator card having determined that a data-writing address of the first message falls within a memory-address range, the to-be-transmitted datum in the first message is written into the internal memory of the second accelerator card itself.

In an alternative embodiment, the apparatus further comprises:

a reading-writing determining module configured for receiving a second message and converting the second message into a target format;

in response to it being determined that a data-writing address of the second message falls within a register-address range, writing a datum in the second message into a register of the first accelerator card itself; and by using the datum in the register, configuring an entry of an address mapping table, and/or modifying a period of broadcasting of a storage-resource-usage datum.

In an alternative embodiment, the reading-writing determining module is further configured for:

in response to it being determined that the data-writing address of the second message falls within a memory-address range, writing the datum in the second message into an internal memory of the first accelerator card itself.

In an alternative embodiment, the apparatus further comprises:

a mainframe responding module configured for receiving a direct-memory-access request sent by an external mainframe;

inquiring, in the address mapping table, a memory address corresponding to a virtual address in the direct-memory-access request; and according to the memory address, completing the direct-memory-access request.

In an alternative embodiment, the apparatus further comprises:

a sending module configured for, if the to-be-transmitted datum is the final result of the acceleration task, sending the to-be-transmitted datum to an external mainframe.

In an alternative embodiment, the apparatus further comprises:

a task receiving module configured for receiving the acceleration task sent by the external mainframe via an exchange network.

In an alternative embodiment, a downstream interface of the first accelerator card is a root-device-mode interface or slave-device-mode interface that supports a serial computer expansion bus standard, and a bus-address range of the downstream interface is not less than a bus-address range of a downstream device connected thereto.

In an alternative embodiment, the downstream interface is configured by:

by using an upstream interface of the first accelerator card, receiving a configuring message of the downstream interface;

converting the configuring message into a second message that meets the serial computer expansion bus standard;

according to the second message, configuring the bus-address range of the downstream device, and configuring identifier information for the downstream device; and according to the second message, performing bus-address configuring to a root-device core or slave-device core of the downstream interface, whereby the bus-address range of the downstream interface is not less than the bus-address range of the downstream device.

In an alternative embodiment, before the step of, according to the second message, performing bus-address configuring to the slave-device core of the downstream interface, the process further comprises converting the second message into a data format that matches with the slave-device mode.

In an alternative embodiment, the downstream interface is a plurality of downstream interfaces; and the method further comprises:

receiving a data message sent by a downstream device connected to any instance of the downstream interfaces;

in response to a destination address of the data message being not within a network route window, determining whether the destination address of the data message is within a forwarding route window of the other downstream interfaces; and in response to the destination address of the data message being within a forwarding route window of a destination interface, via the destination interface, forwarding the data message to a downstream device connected to the destination interface, wherein the destination interface refers to at least one of the other downstream interfaces.

The more particular operation processes of the modules and units according to the embodiments of the present embodiment may refer to the corresponding contents disclosed in the above embodiments, and are not discussed further herein.

It can be seen that the embodiments of the present application provide an apparatus of DMA between accelerator cards, which may realize the direct DMA writing operation between different accelerator cards at the hardware level, which simplifies the DMA process, and increases the efficiency of the DMA.

An accelerator card according to the embodiments of the present application will be described below, and the accelerator card described below and the other embodiments described herein may refer to each other.

An embodiment of the present application discloses an accelerator card, wherein the accelerator card comprises:

a memory configured for storing a computer program; and a processor configured for executing the computer program, to implement the method according to any of the above embodiments.

It can be seen that the accelerator card according to the embodiments of the present application can implement the method according to any one of the above embodiments, and the accelerator card is provided with a direct-memory-access controller.

In an alternative embodiment, the accelerator card is an FPGA accelerator card, an ASIC accelerator card or a multi-core processor.

According to some embodiments, an embodiment of the present application further provides an accelerator card. The accelerator card may be the accelerator card 1 shown in FIG. 8, and may also be the accelerator card 2 shown in FIG. 9. Both of FIGS. 8 and 9 are structural diagrams of an accelerator card according to an illustrative embodiment, and the contents in the figures should not be deemed as limiting the scope of the present application in any manner.

Figure 8:
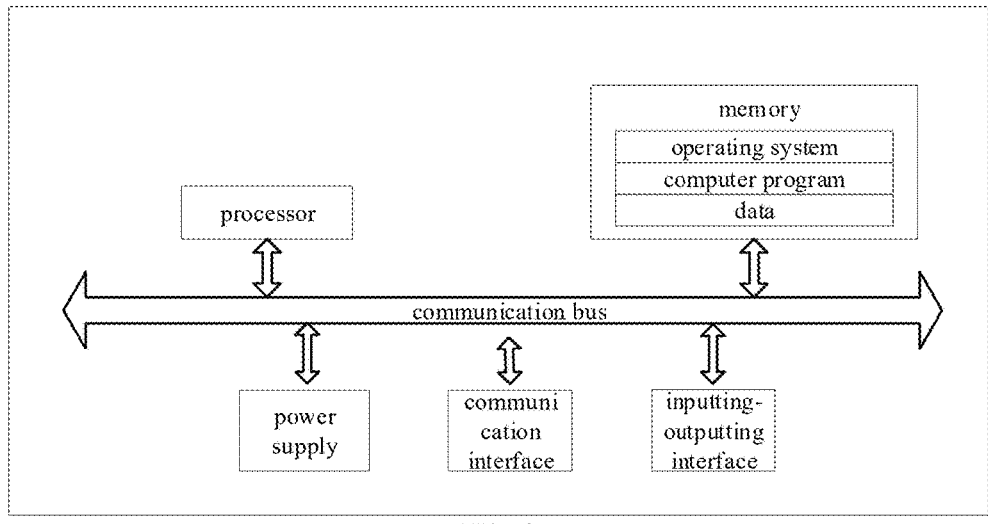
FIG. 8 is a structural diagram of an accelerator card 1 according to the present application.
Figure 9:
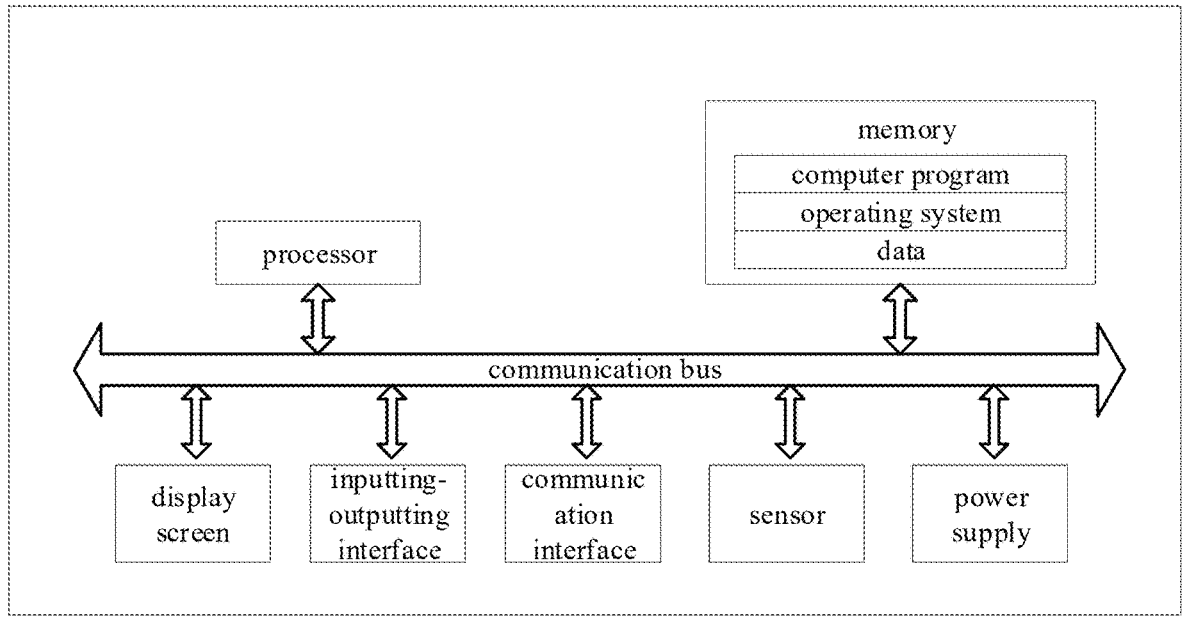
FIG. 9 is a structural diagram of an accelerator card 2 according to the present application.

FIG. 8 is a schematic structural diagram of an accelerator card 1 according to an embodiment of the present application. The accelerator card 1 may comprise at least one processor, at least one memory, a power supply, a communication interface, an inputting-outputting interface and a communication bus. The memory is configured for storing a computer program, and the computer program is loaded and executed by the processor to implement the relevant steps of the method of DMA between accelerator cards according to any one of the above embodiments.

In the embodiments of the present application, the power supply is configured for supplying an operation voltage to the hardware devices of the accelerator card 1. The communication interface can create a DMA channel between the accelerator cards between the accelerator card 1 and an external device, and the communication protocol that it follows is any communication protocol that can apply to the technical solutions of the present application, and is not particularly limited herein. The inputting-outputting interface is configured for acquiring data inputted from the external or outputting data to the external, and its particular interface type may be selected according to particular application demands, and is not particularly limited herein.

In addition, the memory, as the carrier for the resource storage, may be a read-only memory, a random access memory, a magnetic disk, an optical disk and so on, the resource stored therein comprises an operating system, a computer program, data and so on, and the storage mode may be short-term storage or permanent storage.

The operating system is configured for managing and controlling the hardware devices and the computer programs in the accelerator card 1, to implement the operation and the processing of the data in the memory by the processor, and may be Windows Server, Netware, Unix, Linux and so on. The computer program, besides comprising the computer program that can be configured for completing the method of DMA between accelerator cards according to any one of the above embodiments, may further comprise computer programs that can be configured for completing other particular operations. The data may not only include the data such as the updating information of an application program, but also may include the data such as the developer information of an application program.

FIG. 9 is a schematic structural diagram of an accelerator card 2 according to an embodiment of the present application. The accelerator card 2 may include but is not limited to a smartphone, a tablet personal computer, a notebook computer and a desktop computer.

Generally, the accelerator card 2 according to the embodiments of the present application comprises a processor and a memory.

The processor may comprise one or more processing cores, for example, a 4-core processor and an 8-core processor. The processor may be embodied in at least one of the hardware forms of DSP (Digital Signal Processing), FPGA and PLA (Programmable Logic Array). The processor may also comprise a host processor and a co-processor. The host processor refers to a processor configured for processing the data in the awakening state, and is also referred to as a CPU (Central Processing Unit). The co-processor refers to a low-power-consumption processor configured for processing the data in the standby state. In the embodiments of the present application, the processor may be integrated with a GPU, wherein the GPU is configured for rendering and drawing the contents that the display screen is required to display. In the embodiments of the present application, the processor may further comprise an AI (Artificial Intelligence) processor, wherein the AI processor is configured for processing the calculating operations related to machine learning.

The memory may comprise one or more non-volatile computer-readable storage mediums, wherein the non-volatile computer-readable storage mediums may be non-transient. The memory may further comprise a high-speed random access memory and a non-volatile memory, for example, one or more magnetic-disk storage devices and flash-memory storage devices. In the embodiments of the present application, the memory is at least configured for storing the following computer program, wherein the computer program, after loaded and executed by the processor, can implement the relevant steps of the method of DMA between accelerator cards executed by the side of the accelerator card 2 according to any one of the above embodiments. Additionally, the resources stored by the memory may further comprise an operating system, data and so on, wherein the storage mode may be short-term storage or permanent storage. The operating system may include Windows, Unix, Linux and so on. The data may include but are not limited to the information of the updating of application programs.

In the embodiments of the present application, the accelerator card 2 may further comprise a display screen, an inputting-outputting interface, a communication interface, a sensor, a power supply and a communication bus.

A person skilled in the art can understand that the structure shown in FIG. 9 does not limit the accelerator card 2, and the accelerator card 2 may comprise components more or fewer than those illustrated.

An accelerating platform according to the embodiments of the present application will be described below, and the accelerating platform described below and the other embodiments described herein may refer to each other.

Figure 10:
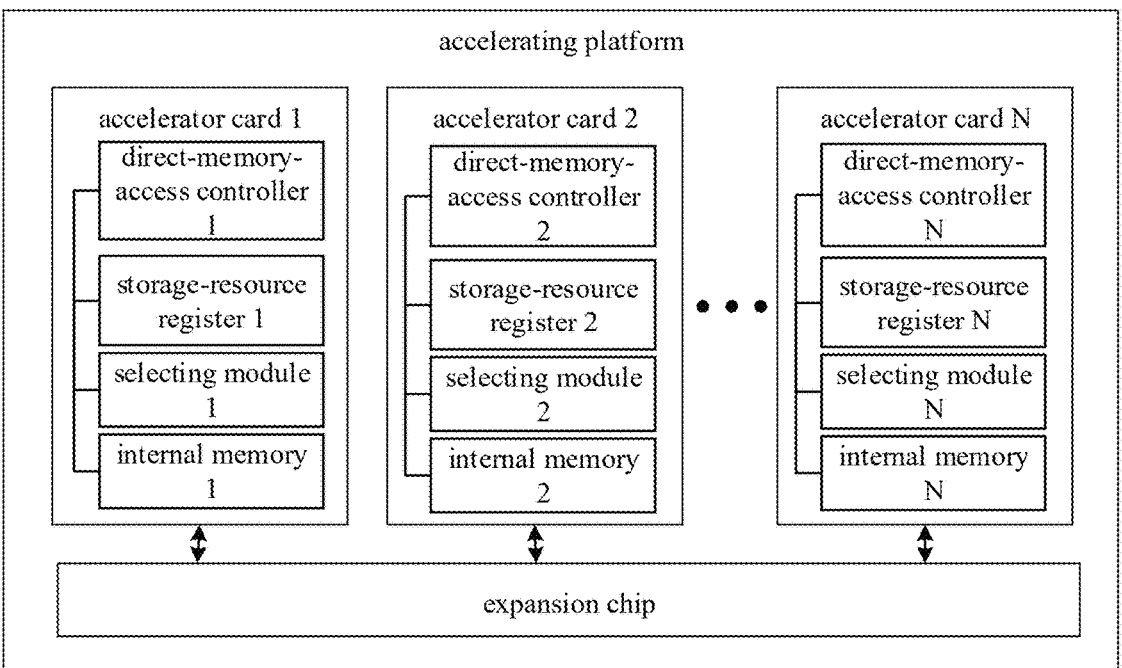
FIG. 10 is a schematic diagram of an accelerating platform according to the present application.

Referring to FIG. 10, an embodiment of the present application provides an accelerating platform, wherein the accelerating platform comprises a plurality of accelerator cards according to the above embodiments, the different accelerator cards are connected by expanding devices, and the different accelerator cards may directly perform DMA therebetween.

Figure 11:
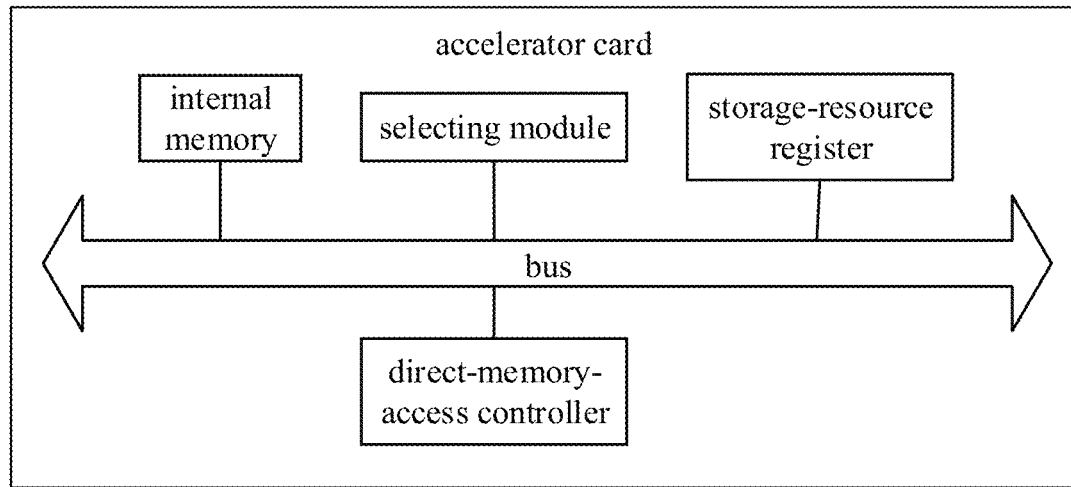
FIG. 11 is a structural diagram of another accelerator card according to the present application.

Referring to FIG. 11, each of the accelerator cards of the accelerating platform according to the embodiments of the present application is provided with a direct-memory-access controller, a storage-resource register, a selecting module and an internal memory. The selecting module, according to idle internal-memory capacities and accelerator-card functions, determines another accelerator card configured for processing a to-be-transmitted datum obtained by execution of an acceleration task, and inquires an idle-internal-memory datum of the another accelerator card. The another accelerator card broadcasts the idle-internal-memory datum in the accelerating platform in response to the idle internal-memory capacity being greater than a preset threshold. The storage-resource register stores the idle-internal-memory datum of the another accelerator card. The direct-memory-access controller, according to the idle-internal-memory datum, writes the to-be-transmitted datum into the internal memory of the another accelerator card in a mode of direct memory access. The accelerator card shown in FIG. 11 and any of the accelerator cards mentioned in the above embodiments may refer to each other.

In an alternative embodiment, the selecting module further comprises a preestimating unit and a selecting unit;
the preestimating unit preestimates a data-volume size of the to-be-transmitted datum; and
the selecting unit inquires data processing functions of other accelerator cards, and selects an accelerator card the data processing function of which is the same as a next-step processing function of the to-be-transmitted datum and the idle internal-memory capacity of which is not less than the data-volume size.

In an alternative embodiment, each of the accelerator cards is further provided with a resource-sharing module, the resource-sharing module preestimates an internal-memory amount required by the execution of the acceleration task, and in response to a difference between the idle internal-memory capacity of the internal memory and the internal-memory amount being greater than a preset threshold, broadcasts a storage-resource-usage datum of the internal memory to the other accelerator cards. In response to the accelerator card being in an idle state, in response to the idle internal-memory capacity of the internal memory being greater than a preset threshold, the resource-sharing module broadcasts the storage-resource-usage datum of the internal memory to the other accelerator cards.

Correspondingly, the resource-sharing module receives the storage-resource-usage data containing the idle-internal-memory data that are broadcasted by the other accelerator cards in the accelerating platform in response to the idle internal-memory capacity being greater than the preset threshold, and, according to the storage-resource-usage data, updates the idle-internal-memory data of the other accelerator cards that the storage-resource register stores.

In an alternative embodiment, any of the accelerator cards, by using the direct-memory-access controller of the accelerator card itself, according to the idle-internal-memory datum and a memory address occupied by the to-be-transmitted datum in the accelerator card itself, constructs descriptor information; according to the descriptor information, constructs the to-be-transmitted datum into a first message; and sends the first message to the another accelerator card, whereby, the another accelerator card, after determining that the data-writing address of the first message falls within a memory-address range, writes the to-be-transmitted datum in the first message into the internal memory of itself.

In an alternative embodiment, any of the accelerator cards receives a second message (a message for configuring the register) and converts the second message into a target format; if it is determined that the data-writing address of the second message falls within a register-address range, writes the datum in the second message into a register of the accelerator card itself; and by using the datum in the register, configures an entry of an address mapping table, and/or modifies the period of broadcasting of a storage-resource-usage datum. The register of the storage-resource-usage datum and the register of the memory-address mapping table are different. According to some embodiments, the accelerator card, after determining that the data-writing address of the second message falls within a memory-address range, writes the datum in the second message into the internal memory of the accelerator card itself.

In an alternative embodiment, any of the accelerator cards receives a direct-memory-access request sent by an external mainframe; inquires, in the address mapping table, a memory address corresponding to a virtual address in the direct-memory-access request; and according to the memory address, completes the direct-memory-access request.

In an alternative embodiment, if the to-be-transmitted datum is the final result of the acceleration task, the accelerator card sends the to-be-transmitted datum to an external mainframe. The accelerator card receives the acceleration task sent by the external mainframe via an exchange network.

In an alternative embodiment, a downstream interface of any of the accelerator cards is a root-device-mode interface or slave-device-mode interface that supports a serial computer expansion bus standard, and the bus-address range of the downstream interface is not less than the bus-address range of the downstream device connected thereto. In an embodiment, the downstream interface is configured by: by using an upstream interface of the accelerator card, receiving a configuring message of the downstream interface; converting the configuring message into a second message that meets the serial computer expansion bus standard; according to the second message, configuring the bus-address range of the downstream device, and configuring identifier information for the downstream device; and according to the second message, performing bus-address configuring to a root-device core or slave-device core of the downstream interface, whereby the bus-address range of the downstream interface is not less than the bus-address range of the downstream device. In an embodiment, before the step of, according to the second message, performing bus-address configuring to the slave-device core of the downstream interface, the process further comprises converting the second message into a data format that matches with the slave-device mode.

In an alternative embodiment, the downstream interface is a plurality of downstream interfaces. Correspondingly, the method further comprises: the accelerator card receives a data message sent by a downstream device connected to any downstream interface; if the destination address of the data message is not within a network route window, determines whether the destination address of the data message is within a forwarding route window of the other downstream interfaces; and if the destination address of the data message is within a forwarding route window of a destination interface, via the destination interface, forwards the data message to a downstream device connected to the destination interface, wherein the destination interface refers to at least one of the other downstream interfaces.

Figure 12:
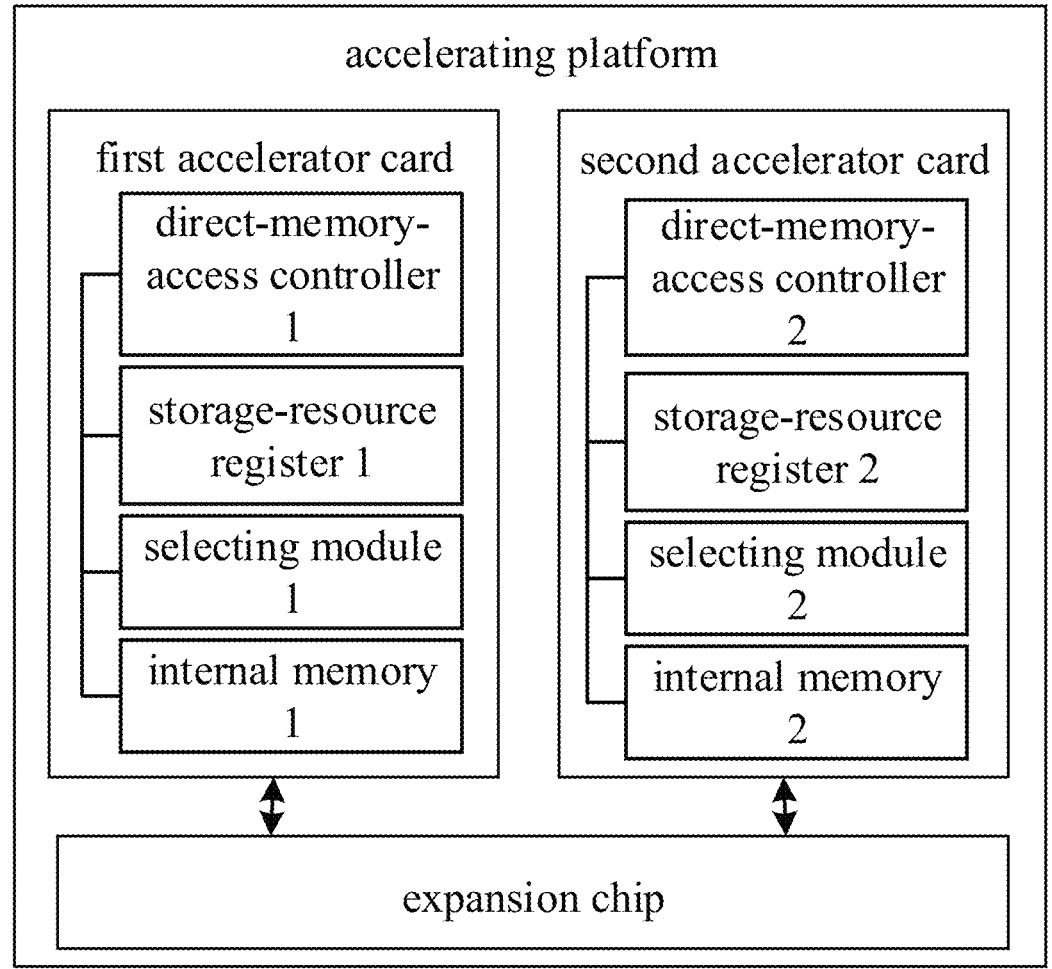
FIG. 12 is a schematic diagram of yet another accelerating platform according to the present application.

Referring to the flow shown in FIG. 1 according to the above embodiments, wherein the accelerating platform that it corresponds to may be seen in FIG. 12, in FIG. 12, the accelerating platform comprises a first accelerator card and a second accelerator card, both of the first accelerator card and the second accelerator card are provided with a direct-memory-access controller, a storage-resource register, a selecting module and an internal-memory, and both of the first accelerator card and the second accelerator card can perform the DMA data transmission according to the flow shown in FIG. 1. The first accelerator card and the second accelerator card are connected by an expanding device.

In the embodiments of the present application, the accelerating platform may comprise accelerator cards such as GPU, FPGA, NPU (Neural Processing Unit, or network processing unit) and TPU (Tensor Processing Unit). The GPU generally performs the pure calculation acceleration. The FPGA may complete applied acceleration processing such as calculation acceleration, network acceleration and storage acceleration.

As shown in FIG. 6, the accelerating platform may communicate with the mainframe server via a switching network, so that the accelerating platform can add high-performance calculation for pooling to the mainframe server in the data center without changing the original topology of the data center. Furthermore, the accelerator cards in the accelerating platform use the PCIE P2P DMA to perform the DMA between the accelerator cards, and both of the GPU accelerator card and the FPGA accelerator card can initiatively initiate the DMA requesting operation, which realizes the P2P DMA when the CPU is decoupled. Furthermore, the accelerator cards can realize the function of PCIE Switch based on themselves, without utilizing an additional PCIE Switch for connection.

A non-volatile readable storage medium according to the embodiments of the present application will be described below, and the non-volatile readable storage medium described below and the other embodiments described herein may refer to each other.

A non-volatile readable storage medium, wherein the non-volatile readable storage medium is configured for storing a computer program, and the computer program, when executed by a processor, implements the method of DMA between accelerator cards according to the above embodiments. The non-volatile readable storage medium is a non-volatile computer-readable storage medium, and, as the carrier for the resource storage, may be a read-only memory, a random access memory, a magnetic disk, an optical disk and so on, the resource stored therein comprises an operating system, a computer program, data and so on, and the storage mode may be short-term storage or permanent storage.

The embodiments of the description are described in the mode of progression, each of the embodiments emphatically describes the differences from the other embodiments, and the same or similar parts of the embodiments may refer to each other.

The steps of the method or algorithm described with reference to the embodiments disclosed herein may be implemented directly by using hardware, a software module executed by a processor or a combination thereof. The software module may be embedded in a Random Access Memory (RAM), an internal memory, a Read-Only Memory (ROM), an electrically programmable ROM, an electrically erasable programmable ROM, a register, a hard disk, a removable disk, a CD-ROM, or a non-volatile readable storage medium in any other form well known in the art.

The principle and the embodiments of the present application are described herein with reference to the particular examples, and the description of the above embodiments is merely intended to facilitate to comprehend the method according to the present application and its core concept. Moreover, for a person skilled in the art, according to the concept of the present application, the particular embodiments and the range of application may be varied. In conclusion, the contents of the description should not be comprehended as limiting the present application.

The invention claimed is:

1. A method of direct memory access DMA between accelerator cards, wherein the method is applied in a first accelerator card in a mainframe-free accelerating platform, and comprises:

in response to an acceleration task having been executed to obtain a to-be-transmitted datum, according to idle internal-memory capacities and accelerator-card functions, determining a second accelerator card in the accelerating platform configured for processing the to-be-transmitted datum, wherein each of accelerator cards in the accelerating platform is provided with a direct-memory-access controller, and the first accelerator card and the second accelerator card are connected by an expansion chip;

inquiring an idle-internal-memory datum of the second accelerator card in the first accelerator card itself, wherein the second accelerator card broadcasts the idle-internal-memory datum in the accelerating platform in response to the idle internal-memory capacity being greater than a preset threshold; and initiatively initiating DMA, to, by using the direct-memory-access controller of the first accelerator card itself and the idle-internal-memory datum, write the to-be-transmitted datum into an internal memory of the second accelerator card in a mode of direct memory access.

2. The method according to claim 1, wherein the step of, according to the idle internal-memory capacities and the accelerator-card functions, determining the second accelerator card in the accelerating platform configured for processing the to-be-transmitted datum comprises:

preestimating a data-volume size of the to-be-transmitted datum; and determining the second accelerator card that has a function of processing the to-be-transmitted datum and the idle internal-memory capacity of which is not less than the data-volume size.

3. The method according to claim 2, wherein the step of determining the second accelerator card that has the function of processing the to-be-transmitted datum and the idle internal-memory capacity of which is not less than the data-volume size comprises:

inquiring data processing functions of the other accelerator cards than the first accelerator card in the accelerating platform, and selecting a candidate accelerator card the data processing function of which is the same as a next-step processing function of the to-be-transmitted datum; and determining at least one instance of the candidate accelerator card the idle internal-memory capacity of which is not less than the data-volume size to be the second accelerator card.

4. The method according to claim 1, wherein the method further comprises:

preestimating an internal-memory amount required by the execution of the acceleration task, and in response to a difference between a current idle internal-memory capacity of the first accelerator card itself and the internal-memory amount being greater than a preset threshold, broadcasting a storage-resource-usage datum of the first accelerator card itself to the other accelerator cards than the first accelerator card in the accelerating platform.

5. The method according to claim 1, wherein the method further comprises:

receiving storage-resource-usage data broadcasted by the other accelerator cards than the first accelerator card in the accelerating platform, wherein each of the other accelerator cards broadcasts the storage-resource-usage datum containing the idle-internal-memory datum in the accelerating platform in response to the idle internal-memory capacity being greater than the preset threshold; and according to the storage-resource-usage data, updating the idle-internal-memory data of the other accelerator cards that the first accelerator card itself stores.

6. The method according to claim 1, wherein the step of, by using the direct-memory-access controller of the first accelerator card itself and the idle-internal-memory datum, writing the to-be-transmitted datum into the internal memory of the second accelerator card in the mode of direct memory access comprises:

by using the direct-memory-access controller of the first accelerator card itself, according to the idle-internal-memory datum and a memory address occupied by the to-be-transmitted datum in the first accelerator card itself, constructing descriptor information;

according to the descriptor information, constructing the to-be-transmitted datum into a first message; and sending the first message to the second accelerator card, whereby the second accelerator card writes the to-be-transmitted datum in the first message into the internal memory of the second accelerator card itself.

7. The method according to claim 6, wherein the step of, by the second accelerator card, writing the to-be-transmitted datum in the first message into the internal memory of the second accelerator card itself comprises:

by the second accelerator card, in response to the second accelerator card having determined that a data-writing address of the first message falls within a memory-address range, writing the to-be-transmitted datum in the first message into the internal memory of the second accelerator card itself.

8. The method according to claim 1, wherein the method further comprises:

receiving a second message and converting the second message into a target format;

in response to it being determined that a data-writing address of the second message falls within a register-address range, writing a datum in the second message into a register of the first accelerator card itself; and by using the datum in the register, configuring an entry of an address mapping table, and/or modifying a period of broadcasting of a storage-resource-usage datum.

9. The method according to claim 8, wherein the method further comprises:

in response to it being determined that the data-writing address of the second message falls within a memory-address range, writing the datum in the second message into an internal memory of the first accelerator card itself.

10. The method according to claim 8, wherein the method further comprises:

receiving a direct-memory-access request sent by an external mainframe;

inquiring, in the address mapping table, a memory address corresponding to a virtual address in the direct-memory-access request; and according to the memory address, completing the direct-memory-access request.

11. The method according to claim 1, wherein a downstream interface of the first accelerator card is a root-device-mode interface or slave-device-mode interface that supports a serial computer expansion bus standard, and a bus-address range of the downstream interface is not less than a bus-address range of a downstream device connected thereto.

12. The method according to claim 11, wherein the downstream interface is configured by:

by using an upstream interface of the first accelerator card, receiving a configuring message of the downstream interface;

converting the configuring message into a second message that meets the serial computer expansion bus standard;

according to the second message, configuring the bus-address range of the downstream device, and configuring identifier information for the downstream device; and according to the second message, performing bus-address configuring to a root-device core or slave-device core of the downstream interface, whereby the bus-address range of the downstream interface is not less than the bus-address range of the downstream device.

13. The method according to claim 12, wherein before the step of, according to the second message, performing bus-address configuring to the slave-device core of the downstream interface, the method further comprises converting the second message into a data format that matches with the slave-device mode.

14. The method according to claim 11, wherein the downstream interface is a plurality of downstream interfaces; and the method further comprises:

receiving a data message sent by a downstream device connected to any instance of the downstream interfaces;

in response to a destination address of the data message being not within a network route window, determining whether the destination address of the data message is within a forwarding route window of the other downstream interfaces; and in response to the destination address of the data message being within a forwarding route window of a destination interface, via the destination interface, forwarding the data message to a downstream device connected to the destination interface, wherein the destination interface refers to at least one of the other downstream interfaces.

15. An accelerating platform, wherein the accelerating platform comprises a plurality of accelerator cards, and the different instances of the accelerator cards are connected by expansion chips;

each of the accelerator cards is provided with a direct-memory-access controller, a storage-resource register, a selecting module and an internal memory;

the selecting module, according to idle internal-memory capacities and accelerator-card functions, determines another accelerator card configured for processing a to-be-transmitted datum obtained by execution of an acceleration task, and inquires an idle-internal-memory datum of the another accelerator card;

the another accelerator card broadcasts the idle-internal-memory datum in the accelerating platform in response to the idle internal-memory capacity being greater than a preset threshold;

the storage-resource register stores the idle-internal-memory datum of the another accelerator card; and the direct-memory-access controller initiatively initiates DMA, to, according to the idle-internal-memory datum, write the to-be-transmitted datum into the internal memory of the another accelerator card in a mode of direct memory access.

16. The accelerating platform according to claim 15, wherein the selecting module further comprises a preestimating unit and a selecting unit;

the preestimating unit preestimates a data-volume size of the to-be-transmitted datum; and the selecting unit inquires data processing functions of other accelerator cards, and selects an accelerator card the data processing function of which is the same as a next-step processing function of the to-be-transmitted datum and the idle internal-memory capacity of which is not less than the data-volume size.

17. The accelerating platform according to claim 15, wherein each of the accelerator cards is further provided with a resource-sharing module, the resource-sharing module preestimates an internal-memory amount required by the execution of the acceleration task, and in response to a difference between the idle internal-memory capacity of the internal memory and the internal-memory amount being greater than a preset threshold, broadcasts a storage-resource-usage datum of the internal memory to the other accelerator cards;

in response to the accelerator card being in an idle state, in response to the idle internal-memory capacity of the internal memory being greater than a preset threshold, the resource-sharing module broadcasts the storage-resource-usage datum of the internal memory to the other accelerator cards; and the resource-sharing module receives the storage-resource-usage data containing the idle-internal-memory data that are broadcasted by the other accelerator cards in the accelerating platform in response to the idle internal-memory capacity being greater than the preset threshold, and, according to the storage-resource-usage data, updates the idle-internal-memory data of the other accelerator cards that the storage-resource register stores.

18. An accelerator card, wherein the accelerator card is provided with a direct-memory-access controller, a storage-resource register, a selecting module and an internal memory;

the selecting module, according to idle internal-memory capacities and accelerator-card functions, determines another accelerator card configured for processing a to-be-transmitted datum obtained by execution of an acceleration task, and inquires an idle-internal-memory datum of the another accelerator card;

the another accelerator card broadcasts the idle-internal-memory datum in the accelerating platform in response to the idle internal-memory capacity being greater than a preset threshold;

the different accelerator cards are connected by an expansion chip;

the storage-resource register stores the idle-internal-memory datum of the another accelerator card; and the direct-memory-access controller initiatively initiates DMA, to, according to the idle-internal-memory datum, write the to-be-transmitted datum into the internal memory of the another accelerator card in a mode of direct memory access.

19. The accelerator card according to claim 18, wherein the accelerator card is an FPGA (Field Programmable Gate Array) accelerator card, an ASIC (Application Specific Integrated Circuit) accelerator card or a multi-core processor.

20. A non-transitory readable storage medium, wherein the non-transitory readable storage medium is configured for storing a computer program, and the computer program, when executed by a processor, implements the method according to claim 1.

* * * * *